US012666314B2

(12) United States Patent
Foti

(10) Patent No.: US 12,666,314 B2
(45) Date of Patent: Jun. 23, 2026

(54) METHODS FOR CONTROLLING A SERVICE SESSION HANDOVER BETWEEN NETWORK SLICES, NETWORK NODES AND A COMMUNICATIONS DEVICE IMPLEMENTING THE METHODS IN A COMMUNICATIONS NETWORK

(71) Applicant: Telefonaktiebolaget LM Ericsson (publ), Stockholm (SE)

(72) Inventor: George Foti, Dollard des Ormeaux (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 263 days.

(21) Appl. No.: 18/290,588

(22) PCT Filed: Jul. 27, 2021

(86) PCT No.: PCT/SE2021/050756
§ 371 (c)(1),
(2) Date: Jan. 19, 2024

(87) PCT Pub. No.: WO2023/009046
PCT Pub. Date: Feb. 2, 2023

(65) Prior Publication Data
US 2024/0259887 A1     Aug. 1, 2024

(51) Int. Cl.
*H04W 8/26*      (2009.01)
*H04L 65/1016*      (2022.01)
(Continued)

(52) U.S. Cl.
CPC ..... *H04W 36/0027* (2013.01); *H04L 65/1016* (2013.01); *H04L 65/1086* (2013.01); *H04W 8/26* (2013.01)

(58) Field of Classification Search
CPC ..... H04W 36/08; H04W 36/22; H04W 48/18; H04W 76/10
See application file for complete search history.

(56) References Cited

U.S. PATENT DOCUMENTS

2018/0317133 A1* 11/2018 Sciancalepore ....... H04W 24/02
2019/0261233 A1   8/2019 Duan et al.
2023/0014464 A1* 1/2023 Fu ......................... H04W 36/12

* cited by examiner

*Primary Examiner* — Sam Bhattacharya
(74) *Attorney, Agent, or Firm* — FBT Gibbons LLP

(57) ABSTRACT

A method for controlling a service session handover between network slices. The service session may be a multimedia session, for example an IMS session. The method comprises establishing (801) a first default data session on a first network slice of a communications network based on a first network slice identifier of the first network slice such that a first network address of the first communications device, a first application node of an application layer system, and a first access gateway of the application layer system is associated with the first default data session. The method further comprises establishing (802) an associated first dedicated service session with a second communications device over a first dedicated data session based on the first default data session on the first network slice. The method further comprises establishing (803) a second default data session on a second network slice of the communications network based on a second network slice identifier of the second network slice such that a second network address of the first communications device, a second application node of the application layer system, and a second access gateway of the application layer system is associated with the second default data session. The method further comprises sending (804) a session controlling message to the first application node, the session controlling message comprising: the second network address of the first communications device, a network address of the second (Continued)

801 establish first default data session 802 establish associated dedicated service session to second communications device 803 establish second default data session 804 send session controlling message to first application node. The session initiation message comprises: the second network address of the first communications device, a network address of the second application node, and a service session identifier of the dedicated data session between the first communications device and the second communications device 805 receive second session controlling message with information related to the network resources of the second access gateway for handling the service session over the second network slice 806 send third session controlling message to the first application node comprising an egress network address of the second access gateway application node, and a session identifier of the first dedicated service session, to enable reserving network resources of the second access gateway for a second dedicated service session between the first communications device and the second communications device established over a second dedicated data session based on the second default data session on the second network slice, such that handover of the first dedicated service session between the first network slice and the second network slice is enabled.

15 Claims, 21 Drawing Sheets

(51) Int. Cl.
    *H04L 65/1083*     (2022.01)
    *H04W 36/00*     (2009.01)

500a

500b

Initial setup

After handover

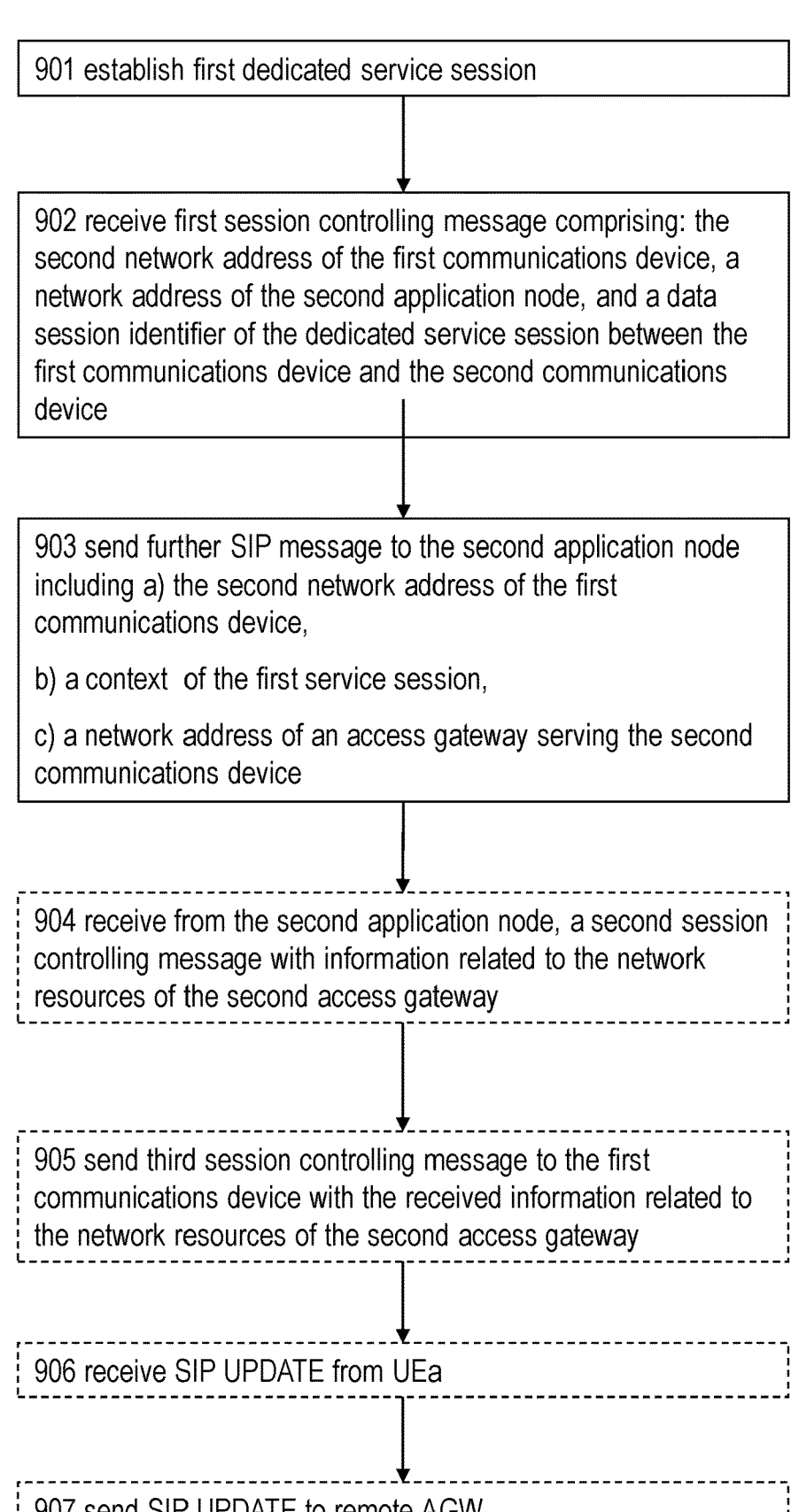

901 establish first dedicated service session 902 receive first session controlling message comprising: the second network address of the first communications device, a network address of the second application node, and a data session identifier of the dedicated service session between the first communications device and the second communications device 903 send further SIP message to the second application node including a) the second network address of the first communications device, b) a context of the first service session, c) a network address of an access gateway serving the second communications device 904 receive from the second application node, a second session controlling message with information related to the network resources of the second access gateway 905 send third session controlling message to the first communications device with the received information related to the network resources of the second access gateway 906 receive SIP UPDATE from UEa 907 send SIP UPDATE to remote AGW

Fig. 9

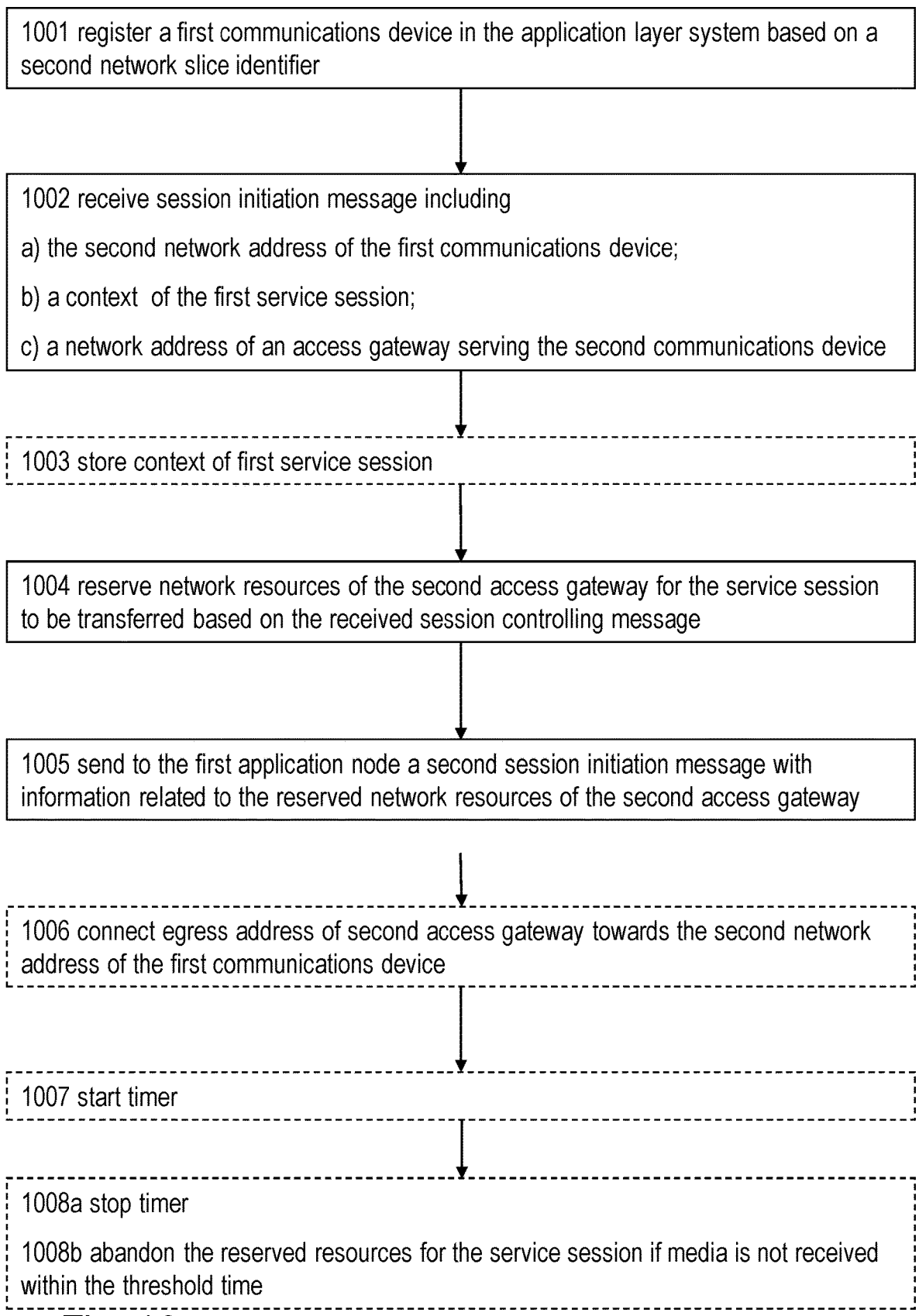

1001 register a first communications device in the application layer system based on a second network slice identifier 1002 receive session initiation message including a) the second network address of the first communications device;

b) a context of the first service session;

c) a network address of an access gateway serving the second communications device 1003 store context of first service session 1004 reserve network resources of the second access gateway for the service session to be transferred based on the received session controlling message 1005 send to the first application node a second session initiation message with information related to the reserved network resources of the second access gateway 1006 connect egress address of second access gateway towards the second network address of the first communications device 1007 start timer 1008a stop timer 1008b abandon the reserved resources for the service session if media is not received within the threshold time

3310 Host computer

3311 SW

3312 Host application

3315 HW

3316 Communication interface

3318 Processing circuitry

3360

3320 Base station

3321 SW

3325 HW

3326 Communication interface

3327 Radio interface

3328 Processing circuitry

3350

3330 UE

3331 SW

3332 Client application

3335 HW

3337 Radio interface

3338 Processing circuitry

3370

METHODS FOR CONTROLLING A SERVICE SESSION HANDOVER BETWEEN NETWORK SLICES, NETWORK NODES AND A COMMUNICATIONS DEVICE IMPLEMENTING THE METHODS IN A COMMUNICATIONS NETWORK

CROSS REFERENCE TO RELATED DATA

This application is a national-phase entry under 35 USC § 371 of International Application No. PCT/SE2021/050756, filed Jul. 27, 2021, titled "Methods for Controlling a Service Session Handover Between Network Slices, Network Nodes and a Communications Device Implementing the Methods in a Communications Network," the contents of which are hereby incorporated herein in its entirety.

TECHNICAL FIELD

The embodiments herein relate to methods for controlling a service session handover between network slices and network nodes and a communications device implementing the methods in a communications network. A corresponding computer program and computer program carrier are also disclosed.

BACKGROUND

In a typical wireless communication network, wireless devices, also known as wireless communication devices, mobile stations, stations (STA) and/or User Equipment (UE), communicate via a Local Area Network such as a Wi-Fi network or a Radio Access Network (RAN) to one or more core networks (CN). The RAN covers a geographical area which is divided into service areas or cell areas, which may also be referred to as a beam or a beam group, with each service area or cell area being served by a radio access node such as a radio access node e.g., a Wi-Fi access point or a radio base station (RBS), which in some networks may also be denoted, for example, a NodeB, eNodeB (eNB), or gNB as denoted in 5G. A service area or cell area is a geographical area where radio coverage is provided by the radio access node. The radio access node communicates over an air interface operating on radio frequencies with the wireless device within range of the radio access node.

Specifications for the Evolved Packet System (EPS), also called a Fourth Generation (4G) network, have been completed within the 3rd Generation Partnership Project (3GPP) and this work continues in the coming 3GPP releases, for example to evolve the specifications of the Fifth Generation (5G) network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio access nodes are directly connected to the EPC core network rather than to RNCs used in 3G networks. In general, in E-UTRAN/LTE the functions of a 3G RNC are distributed between the radio access nodes, e.g. eNodeBs in LTE, and the core network. As such, the RAN of an EPS has an essentially "flat" architecture comprising radio access nodes connected directly to one or more core networks, i.e. they are not connected to RNCs. To compensate for that, the E-UTRAN specification defines a direct interface between the radio access nodes, this interface being denoted the X2 interface.

Wireless Communication Systems in 3GPP

FIG. 1 illustrates a simplified wireless communication system. Consider the simplified wireless communication system in FIG. 1, with a UE 12, which communicates with one or multiple access nodes 103-104, which in turn are connected to a network node 106. The access nodes 103-104 are part of a radio access network 10.

For wireless communication systems pursuant to 3GPP Evolved Packet System, (EPS), also referred to as Long Term Evolution, LTE, or 4G, standard specifications, such as specified in 3GPP TS 36.300 and related specifications, the access nodes 103-104 corresponds typically to Evolved NodeBs (eNBs) and the network node 106 corresponds typically to either a Mobility Management Entity (MME) and/or a Serving Gateway (SGW). The eNB is part of the radio access network 10, which in this case is the E-UTRAN (Evolved Universal Terrestrial Radio Access Network), while the MME and SGW are both part of the EPC (Evolved Packet Core network). The eNBs are inter-connected via the X2 interface, and connected to EPC via the S1 interface, more specifically via S1-C to the MME and S1-U to the SGW.

FIG. 2 illustrates a 5G reference architecture as defined by 3GPP.

For wireless communications systems pursuant to the 3GPP 5G System, 5GS (also referred to as New Radio, NR, or 5G) standard specifications, such as specified in 3GPP TS 38.300 and related specifications, on the other hand, the access nodes 103-104 of FIG. 1 correspond typically to a 5G NodeB (gNB) of a 5G Access Network (AN) 203 and the network node 106 corresponds typically to either an Access and Mobility Management Function (AMF) 206a and/or a User Plane Function (UPF) 206b. The 5G AN 203 may be a Radio Access Network (RAN) corresponding to the radio access network 10 of FIG. 1. In the 5G case the RAN is called NG-RAN (Next Generation Radio Access Network). The AMF 206a and UPF 206b are both part of the 5G Core Network (5GC). The gNBs may be inter-connected via an Xn interface, and connected to 5GC via the NG interface, more specifically via NG-C to the AMF and NG-U to the UPF. In FIG. 2 the NG-U interface is referred to as N3, while the NG-C interface is referred to as N2 in line with 3gpp terminology. An interface N1 is arranged between the UE 12 and the AMF 206a.

The AN 203 may further comprise an Access Gateway (AGW) (not shown in FIG. 2) which acts essentially as the Mobile IP client on behalf of the UE 12.

To support fast mobility between NR and LTE and avoid change of core network, LTE eNBs can also be connected to the 5G-CN via NG-U/NG-C and support the Xn interface. An eNB connected to 5GC is called a next generation eNB (ng-eNB) and is considered part of the NG-RAN. LTE connected to 5GC will not be discussed further in this document; however, it should be noted that most of the solutions/features described for LTE and NR in this document also apply to LTE connected to 5GC. In this document, when the term LTE is used without further specification it refers to LTE-EPC.

FIG. 2 further comprises an Application Function (AF) 220 that interacts with the 3GPP Core Network in order to provide services, for example to support interactions between the 5GC and an Internet Protocol (IP) Multimedia Subsystem or IP Multimedia Core Network Subsystem (IMS). Thus, the AF 220 may support IP-based multimedia services for the UE 12.

The IMS is a standardized architectural framework for delivering IP-based multimedia services. Historically, mobile phones have provided voice call services over a circuit-switched-style network, rather than strictly over an IP packet-switched network. However, now alternative methods of delivering voice, e.g., Voice over IP (VoIP), or other multimedia services have become available. VoIP over a 5G network may also be referred to as Vo5G or Voice over NR (VoNR).

A Proxy Call Session Control Function (P-CSCF) in the role of the AF 220 may interact with the Policy and Charging Architecture of the 5GC, for example with a Policy and Charging Function (PCF) 206*d*. The P-CSCF may be a first contact point within the IP Multimedia Core Network (IM CN) subsystem and it may ensure that relevant Session Initiation Protocol (SIP) messages contain the correct or up to date information about a user location information of the UE 12 provided by the access network 203 currently used by the UE 12.

The SIP is a signaling protocol used for initiating, maintaining, and terminating real-time sessions that include voice, video and messaging applications. SIP is for example used for signaling and controlling multimedia communication sessions in applications of Internet telephony for voice and video calls, in private IP telephone systems, in instant messaging over IP networks as well as mobile phone calling over LTE (VoLTE). The 5G System architecture supports an N5 interface between the PCF 206*d* and the P-CSCF and also supports an Rx interface between the PCF 206*d* and the P-CSCF, to enable IMS service. Rx support between the PCF 206*d* and the P-CSCF may be needed for backwards compatibility for early deployments using Diameter between the IMS and the 5GC functions.

The PCF 206*d* supports a unified policy framework to govern the network behavior. Specifically, the PCF 206*d* may provide Policy and Charging Control (PCC) rules to a Session Management Function (SMF) 206*c* together with an authorized Quality of Service (QoS) to be enforced by the SMF 206*c*. Further, the PCF 206*d* may request access network information, including user location information, from the SMF 206*c* and reports the received access network information, including the user location information, to the P-CSCF.

The SMF 206*c* supports different functionalities. Specifically, the SMF 206*c* may receive PCC rules from the PCF 206*d* over an N7 interface, enforce the authorized QoS and report the access network information to the PCF 206*d* as mentioned above. Further, the SMF 206*c* may have an N4 interface to the UPF 206*b*.

The IMS may further comprise a multimedia application server, such as a Multimedia Telephony Application Server (MTAS).

The IMS may further comprise other types of CSCFs, e.g., a Serving CSCF (S-CSCF) and an Interrogating CSCF (I-CSCF).

The IMS may further comprise an access transfer gateway (ATGW) that provides an anchor point for a data stream, such as a Real-time Transport Protocol (RTP) stream.

FIG. 3 illustrates two 5G reference architectures, an originating 5G network 200*a* and a terminating 5G network 200*b* involved in an IMS session, such as a VoIP session. An originating UE 12*a* in the originating 5G network calls a terminating UE 12*b* in the terminating 5G network 200*b*. The originating network 200*a* comprises an originating AN

203*a*, an originating CN 206*a* and an originating IMS 210*a*. The terminating network 200*b* comprises a terminating AN 203*b*, a terminating CN 206*b* and a terminating IMS 210*b*.

Embodiments herein relate to IMS and therefore a brief overview of a procedure for establishing an IMS session will first be given. First the UE 12 attaches to a communications network, such as a 5G network. For example, the UE 12 may make an NR Attach to an NR access network. Then a default PDU session for IMS is established with the communications network, e.g., with the core network. Then a default IMS session is established with the communications network. The default IMS session may have certain restrictions, such as a maximum bandwidth. Finally, the UE 12 makes a SIP/IMS registration in the IMS, that is with an application function of the communications network. Then a dedicated IMS session to for example a second UE may be established. For the dedicated IMS session also a subscription of the UE may put certain other restrictions on the dedicated IMS session.

FIG. 4 illustrates the concept of dividing a communications network into network slices. Each network slice may be identified by a corresponding network slice identifier, such a Single Network Slice Selection Assistance Information (S-NSSAI).

FIG. 4 further illustrates how different network slices may provide different services to the UE 12. Network slices may be optimized for network performance for the services expected to run over them. Services running in these network slices may be IMS and/or non-IMS services as illustrated in FIG. 4. FIG. 4 illustrates three 5GC slices: 1) a first network slice NS1 may be adapted for Mobile Broadband (eMBB) and may be used for a non-IMs service and a first IMS service, 2) as second network slice NS2 may be adapted for Mission Critical services (MC) and may be used for a second IMS service, 3) a third network slice NS3 may be adapted for Vehicle-to-everything (V2X) and may be used for a third IMS service and a non-IMS service.

Thus, it is feasible to have numerous IMS services running on different network slices, some IMS services are the same some are different. This may be due to various factors such as an optimized 5GC slice for the IMS service or just convenience. For example, a VoLTE session may run on a network slice for eMBB or even on a network slice for Vehicle-to-Vehicle (V2V). IMS is agnostic to network slices.

It may be the case that an IMS session established over one 5GC slice needs to be transferred seamlessly to another 5GC slice. This may be due to several factors such as the need to terminate a 5GC slice completely because it is no longer needed as the main non-IMS application is completed, and the IMS session over that 5GC slice may be transferred to another 5GC slice. Or the 5GC slice may be draining the battery power of the UE 12 as well.

SUMMARY

An object of embodiments herein may be to obviate some of the problems related to handling service sessions on network slices. Specifically to obviate some of the problems related to service session handover between network slices, or at least reduce the impact of them.

Embodiments herein enable a seamless handover of a service session, such as an IMS session between network slices, e.g., a VoLTE session from one 5GC slice to another.

According to a first aspect, the object is achieved by method for controlling a service session handover between network slices. The service session may be a multimedia session, for example an IMS session.

The method comprises establishing a first default data session on a first network slice of a communications network based on a first network slice identifier of the first network slice such that a first network address of the first communications device, a first application node of an application layer system, and a first access gateway of the application layer system is associated with the first default data session.

The method further comprises establishing an associated first dedicated service session with a second communications device over a first dedicated data session based on the first default data session on the first network slice.

The method further comprises establishing a second default data session over a second network slice of the communications network based on a second network slice identifier of the second network slice such that a second network address of the first communications device, a second application node of the application layer system, and a second access gateway of the application layer system is associated with the second default data session.

The method further comprises sending a session controlling message to the first application node. The session controlling message controls the service session. The session controlling message may be a SIP message. The session controlling message comprises: the second network address of the first communications device, a network address of the second application node, and a session identifier of the first dedicated service session, to enable reserving network resources of the second access gateway for a second dedicated service session between the first communications device and the second communications device established over a second dedicated data session based on the second default data session on the second network slice such that handover of the first dedicated service session between the first network slice and the second network slice is enabled.

According to a second aspect, the object is achieved by a communications device. The communications device is configured to perform the method according to the first aspect.

According to a third aspect, the object is achieved by a method, performed by a first application node of an application layer system controlling service sessions, for controlling a service session handover between network slices.

The method comprises establishing a first dedicated service session between a first communications device and a second communications device established over a first dedicated data session based on a first default data session of the first communications device on a first network slice of a communications network.

The method further comprises receiving, from the first communications device, a session controlling message comprising: a second network address of the first communications device, a network address of a second application node associated with a second default data session of the first communications device established over a second network slice of the communications network, and a session identifier of the first dedicated service session, to enable reserving network resources of a second access gateway for a second dedicated service session between the first communications device and the second communications device established over a second dedicated data session based on the second default data session on the second network slice such that handover of the first dedicated service session between the first network slice and the second network slice is enabled.

Based on the contents of the received session controlling message the method further comprises sending a second session controlling message to the second application node, comprising:

a) the second network address of the first communications device, b) a context of the first dedicated service session, c) a network address of an access gateway serving the second communications device, to enable the second application node to perform network resource reservation and establish a data path with the second communications device for the second dedicated service session between the first communications device and the second communications device, such that handover of the first dedicated service session between the first network slice and the second network slice is enabled.

According to a fourth aspect, the object is achieved by a first application node. The first application node is configured to perform the method according to the third aspect.

According to a fifth aspect, the object is achieved by a method, performed by a second application node of an application layer system, for controlling a service session handover between a first network slice and a second network slice.

The method is at least partly performed during a first dedicated service session between a first communications device and a second communications device established over a first dedicated data session based on a first default data session of the first communications device on the first network slice of a communications network comprising the first and the second network slices. The first default data session is based on a first network slice identifier such that a first network address of the first communications device, a first application node of the application layer system, and a first access gateway of the application layer system is associated with the first default data session.

The method comprises registering the first communications device in the application layer system for a second default service session to be established over a second default data session, based on a second network slice identifier such that a second network address of the first communications device, the second application node, and a second access gateway is associated with the second default service session.

The method further comprises receiving, from a first application node associated with the first network slice and controlling the first dedicated service session, a session controlling message. The session controlling message comprises:

a) the second network address of the first communications device;

b) a context of the first dedicated service session;

c) a network address of an access gateway serving the second communications device, to enable the second application node to perform network resource reservation and establish a data path with the second communications device for a second dedicated service session between the first communications device and the second communications device established over a second dedicated data session based on the second default data session on the second network slice, such that handover of the first dedicated service session between the first network slice and the second network slice is enabled.

The method further comprises reserving network resources of the second access gateway for the first dedicated service session to be transferred to the second dedicated service session based on the received session controlling message.

The method further comprises sending to the first application node a second session controlling message with information related to the reserved network resources of the second access gateway.

According to a sixth aspect, the object is achieved by a second application node. The second application node is configured to perform the method according to the fifth aspect.

According to a seventh aspect, the object is achieved by a computer program comprising instructions, which when executed by a processor, causes the processor to perform actions according to any of the aspects above.

According to an eighth aspect, the object is achieved by a carrier comprising the computer program of the aspect above, wherein the carrier is one of an electronic signal, an optical signal, an electromagnetic signal, a magnetic signal, an electric signal, a radio signal, a microwave signal, or a computer-readable storage medium.

Since the session controlling message, transmitted from the communications device to the first application node, comprises the second network address of the first communications device, the network address of the second application node, and the session identifier of the first dedicated service session, reservation of network resources of the second access gateway for the second dedicated service session between the first communications device and the second communications device is enabled such that handover of the first dedicated service session between the first network slice and the second network slice is enabled.

A further advantage of embodiments herein is that they enable seamless handover of a service session.

A further advantage of embodiments herein is that they provide flexibility for IMS integration with 5GC offered capabilities.

BRIEF DESCRIPTION OF THE DRAWINGS

The various aspects of embodiments disclosed herein, including particular features and advantages thereof, will be readily understood from the following detailed description and the accompanying drawings, in which:

FIG. 9 is a flow chart and illustrates a method for handing over a service session between network slices according to embodiments herein, FIG. 10 is a flow chart and illustrates a method for handing over a service session between network slices according to embodiments herein.

DETAILED DESCRIPTION

As mentioned above, an object of embodiments herein may be to obviate some of the problems related to service session handover between network slices, or at least reduce the impact of them. The service session may for example be an IMS service session, such as a voice service session.

Figure 3:
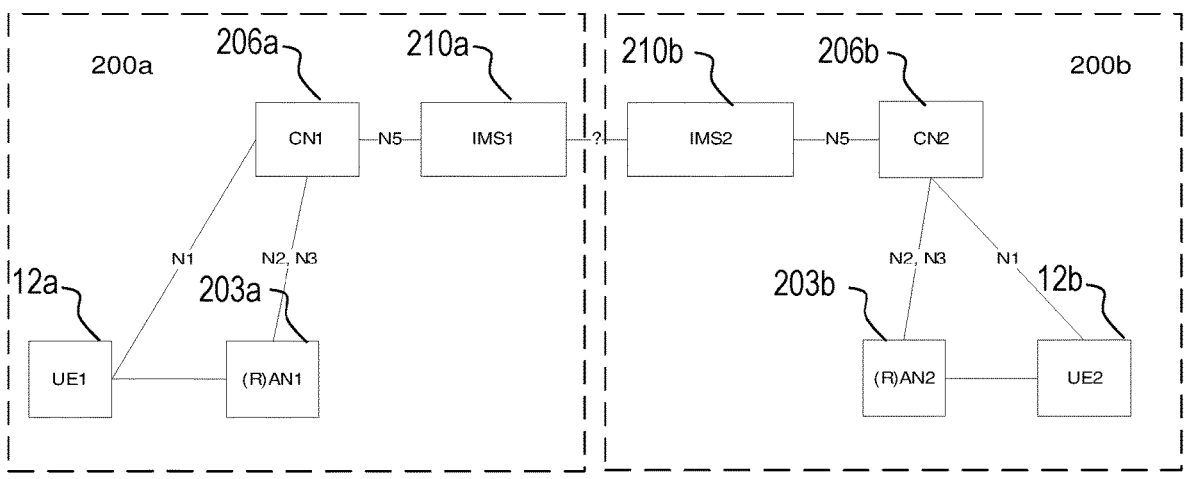
FIG. 3 illustrates two 5G reference architectures as defined by 3GPP, corresponding to an originating and a terminating side of a service session.
Figure 4:
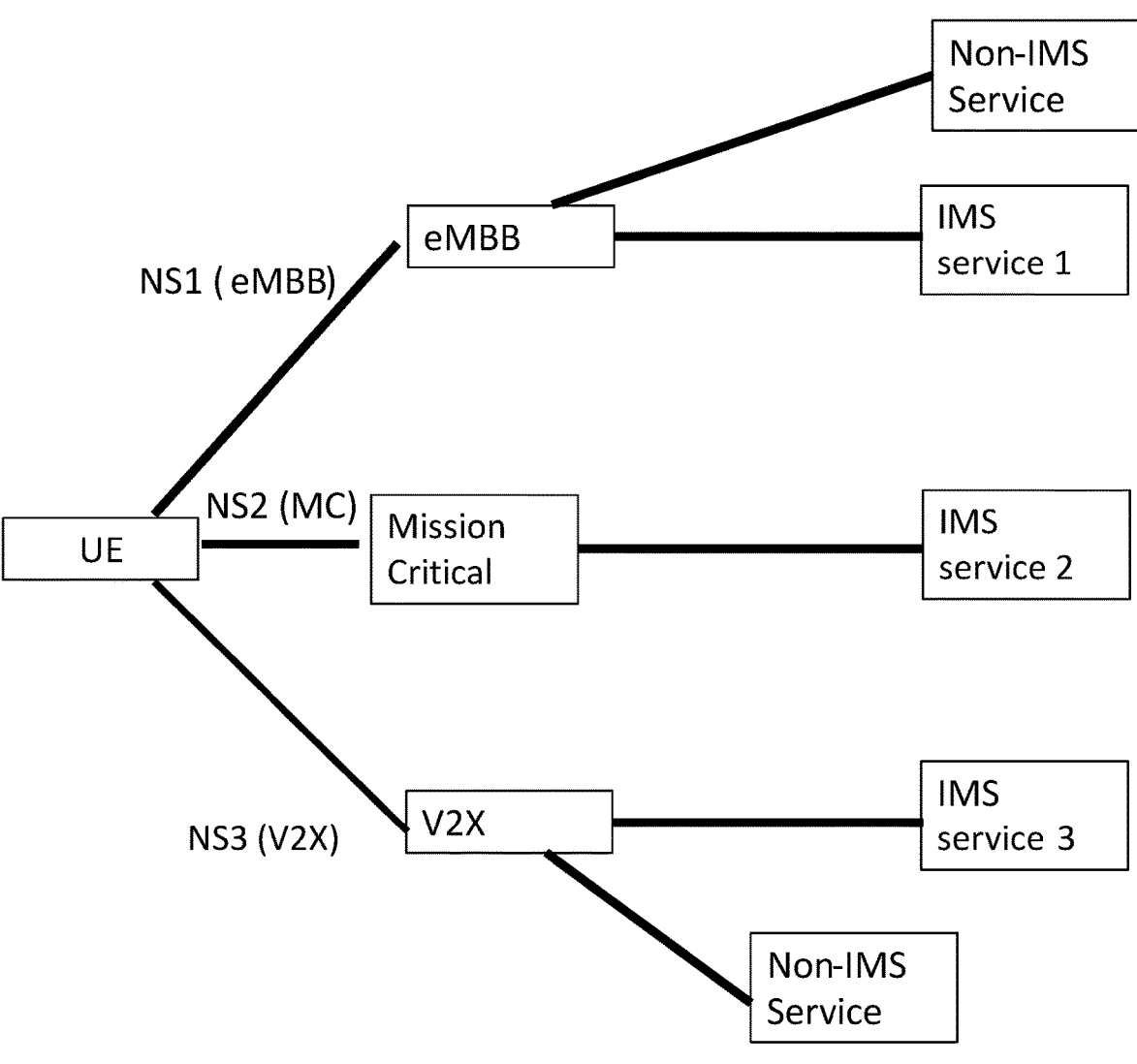
FIG. 4 illustrates a concept of network slices.
Figure 5A:
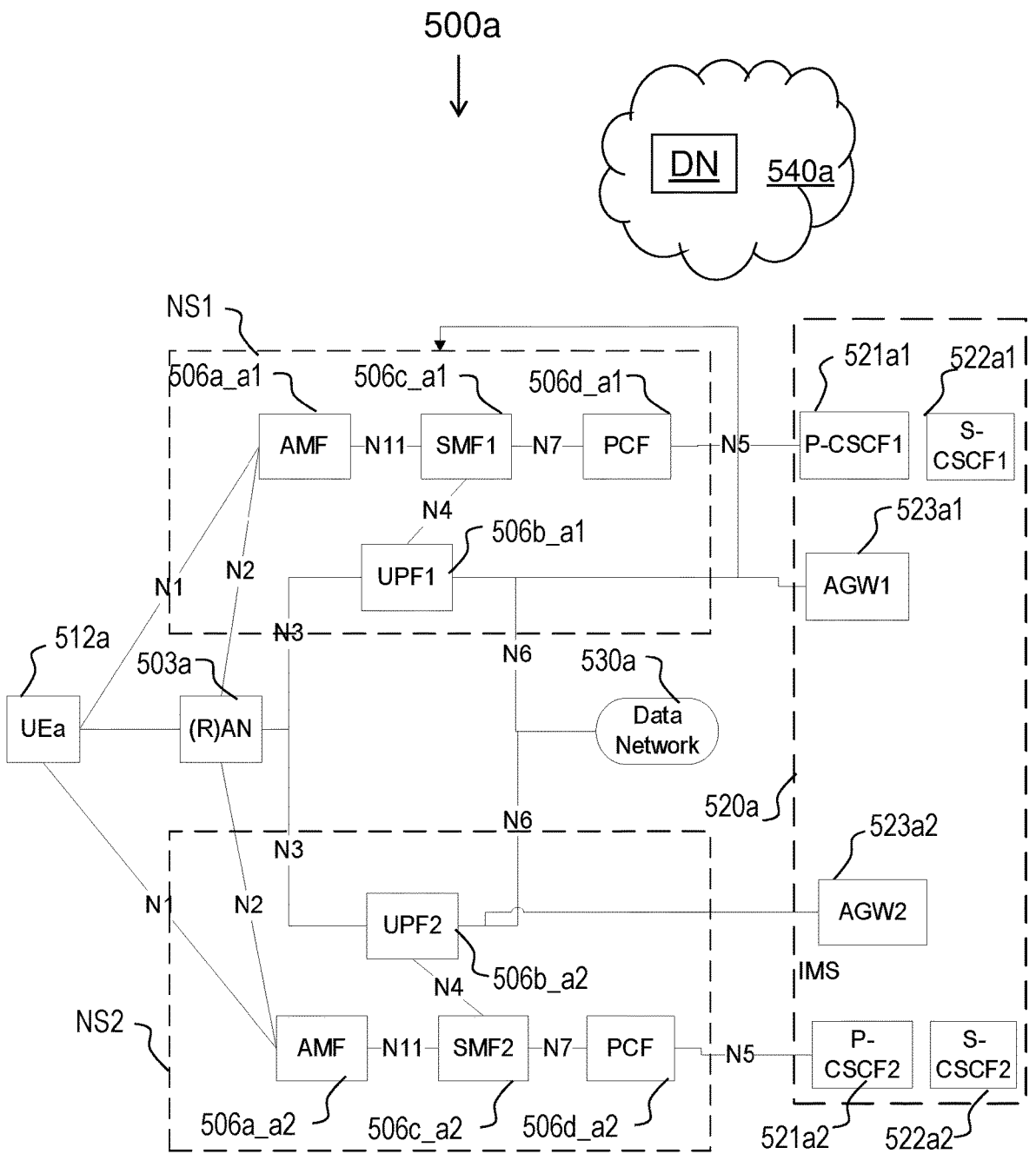
FIG. 5a illustrates a first communications network according to embodiments herein.

Embodiments herein relate to communications networks in general. FIG. 5a is a schematic overview depicting a communications network, such as a first communications network 500a wherein embodiments herein may be implemented. The first communications network 500a may correspond to the originating network 200a of FIG. 3. The first communications network 500a comprises one or more access networks, such as a first AN 503a and one or more CN. The CN of the first communications network 500a may be functionally divided into network slices, such as a first network slice NS1a and a second network slice NS2a. A 5G network architecture has been used in FIG. 5a to illustrate the first communications network 500a. In the following description embodiments will be described with reference to this 5G reference architecture. However, embodiments are also applicable to other network architectures, in particular to other network architectures that support network slicing or something similar to network slicing.

Figure 2:
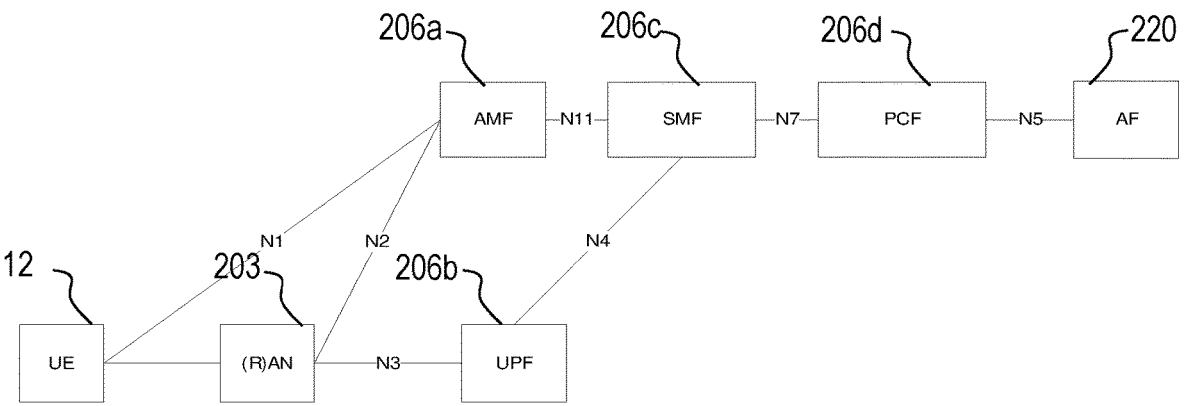
FIG. 2 illustrates a 5G reference architecture as defined by 3GPP.

Each network slice of the first communications network 500a comprises one or more CN nodes. For example, the first network slice NS1 may comprise a first session management node 506c_a1 implementing the SMF 206c and a first policy controlling node 506d_a1 implementing the PCF 206d. The first policy controlling node 506d_a1 may besides handling policies for resource reservation also handle charging. The first network slice NS1 may further comprise a first access and mobility management node 506a_a1 implementing the AMF 206a and a first user plane node 506b_a1 implementing the UPF 206b. The SMF 206c, the PCF 206d, the AMF 206a and the UPF 206b were all described above in relation to FIG. 2.

The second network slice NS2 may comprise a second session management node 506c_a2 and a second policy controlling node 506d_a2. The second network slice NS2 may further comprise a second access and mobility management node 506a_a2 and a second user plane node 506b_a2.

In a 4G-embodiment the session management nodes 506c_a1, 506c_a2 and the access and mobility management nodes 506a_a1, 506a_a2 may be implemented by a Mobility Management Entity (MME). The user plane nodes 506b_a1, 506b_a2 may be implemented by a Packet Data Network Gateway (PDN-GW) in 4G.

The CN nodes may be logical nodes for performing the above-mentioned CN functions which each may be implemented in one or more physical nodes or devices.

The first communications network 500a may be a wireless communications network, or a communications network supporting wireless and wireline convergence, such as 5G Wireless Wireline Convergence. Then the first AN 503a may comprise one or more RANs. The wireless communications network may use a number of different technologies, such as Wi-Fi, Long Term Evolution (LTE), LTE-Advanced, 5G, New Radio (NR), Wideband Code Division Multiple Access (WCDMA), Global System for Mobile communications/ enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context. However, embodiments are also applicable in further development of the existing wireless communications systems such as e.g. LTE.

Access nodes operate in the first communications network 500a, such as a radio access node. The radio access node provides radio coverage over a geographical area, a service area referred to as a cell, which may also be referred to as a beam or a beam group of a first radio access technology (RAT), such as 5G, LTE, Wi-Fi or similar. The radio access node may be a NR-RAN node, transmission and reception point e.g. a base station, a radio access node such as a Wireless Local Area Network (WLAN) access point or an Access Point Station (AP STA), an access controller, a base station, e.g. a radio base station such as a NodeB, an evolved Node B (eNB, eNode B), a gNB, a base transceiver station, a radio remote unit, an Access Point Base Station, a base station router, a transmission arrangement of a radio base station, a stand-alone access point or any other network unit capable of communicating with a wireless device within the service area depending e.g. on the radio access technology and terminology used. The respective radio access node may be referred to as a serving radio access node and communicates with a UE with Downlink (DL) transmissions to the UE and Uplink (UL) transmissions from the UE.

A number of communications devices operate in the first communications network 500a, such as a first communications device 512a. The first communications device 512a may correspond to the originating UE 12a of FIG. 3. The first communications device 512a may be a wireless communications device. Further, the first communications device 512a may be a mobile station, a non-access point (non-AP) STA, a STA, a user equipment (UE) and/or a wireless terminal, that communicate via one or more Access Networks (AN), e.g. RAN, e.g. via the radio access node to one or more CNs.

Figure 1:
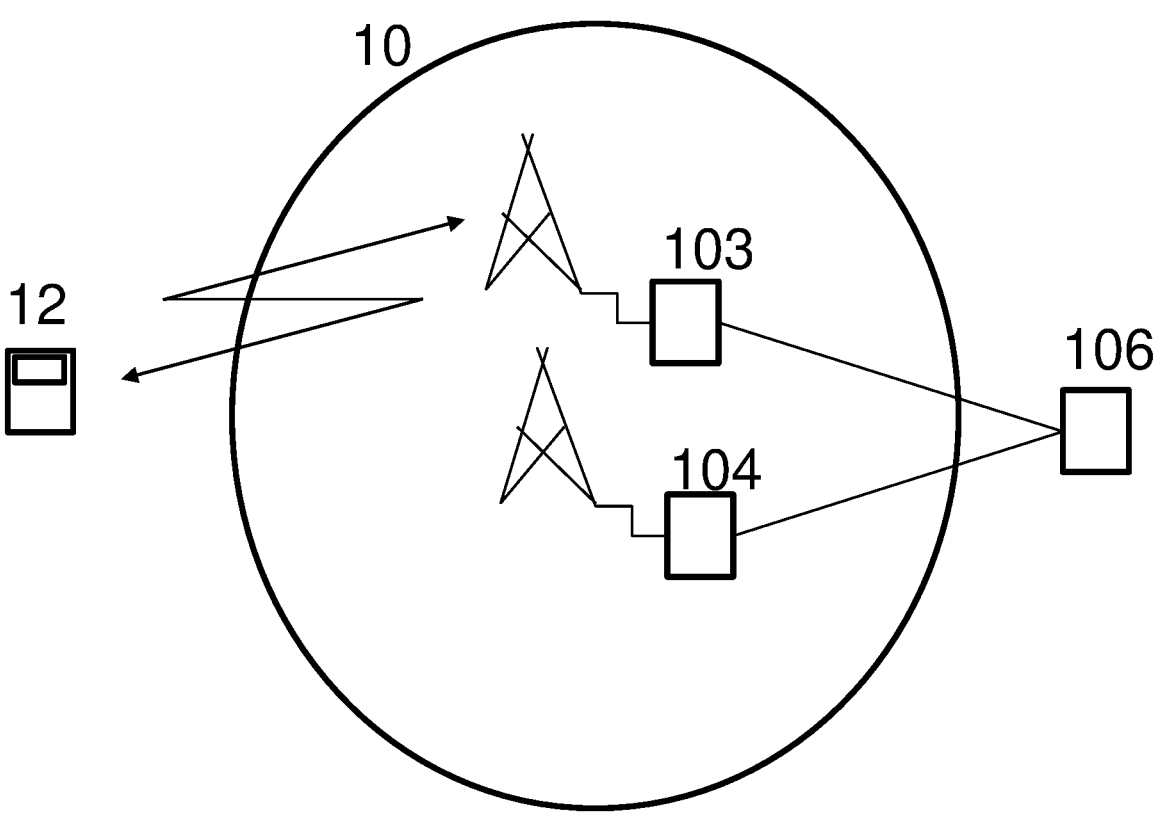
FIG. 1 illustrates a simplified wireless communication system.

The 5G first AN 503a may be a Radio Access Network (RAN) corresponding to the radio access network 10 of FIG. 1. In the 5G case the RAN is called NG-RAN (Next Generation Radio Access Network). The gNBs may be inter-connected via an Xn interface, and connected to 5GC via the NG interface, more specifically via NG-C to the AMF and NG-U to the UPF. The interfaces between the nodes of FIG. 5a correspond to the interfaces of FIG. 2. Specifically, FIG. 5a shows a first interface N1 between the first communications device 512a and the first access and mobility management node 506a_a1, a second interface N2 between the first AN 503a and the first access and mobility management node 506a_a1, a third interface N3 between the first AN 503a and the first user plane node 506b_a1, a fourth interface N4 between the first user plane node 506b_a1 and the first session management node 506c_a1, a fifth interface N5 between the first policy controlling node 506d_a1 and the first application node 521a1 and a further interface N7 between the first session management node 506c_a1 and the first policy controlling node 506d_a1. The first access and mobility management node 506a al may further be interfaced to the first session management node 506c_a1 with an interface referred to as N11. The same interfaces as defined for the network slice NS1 may also be defined for the second network slice NS2.

Figure 5B:
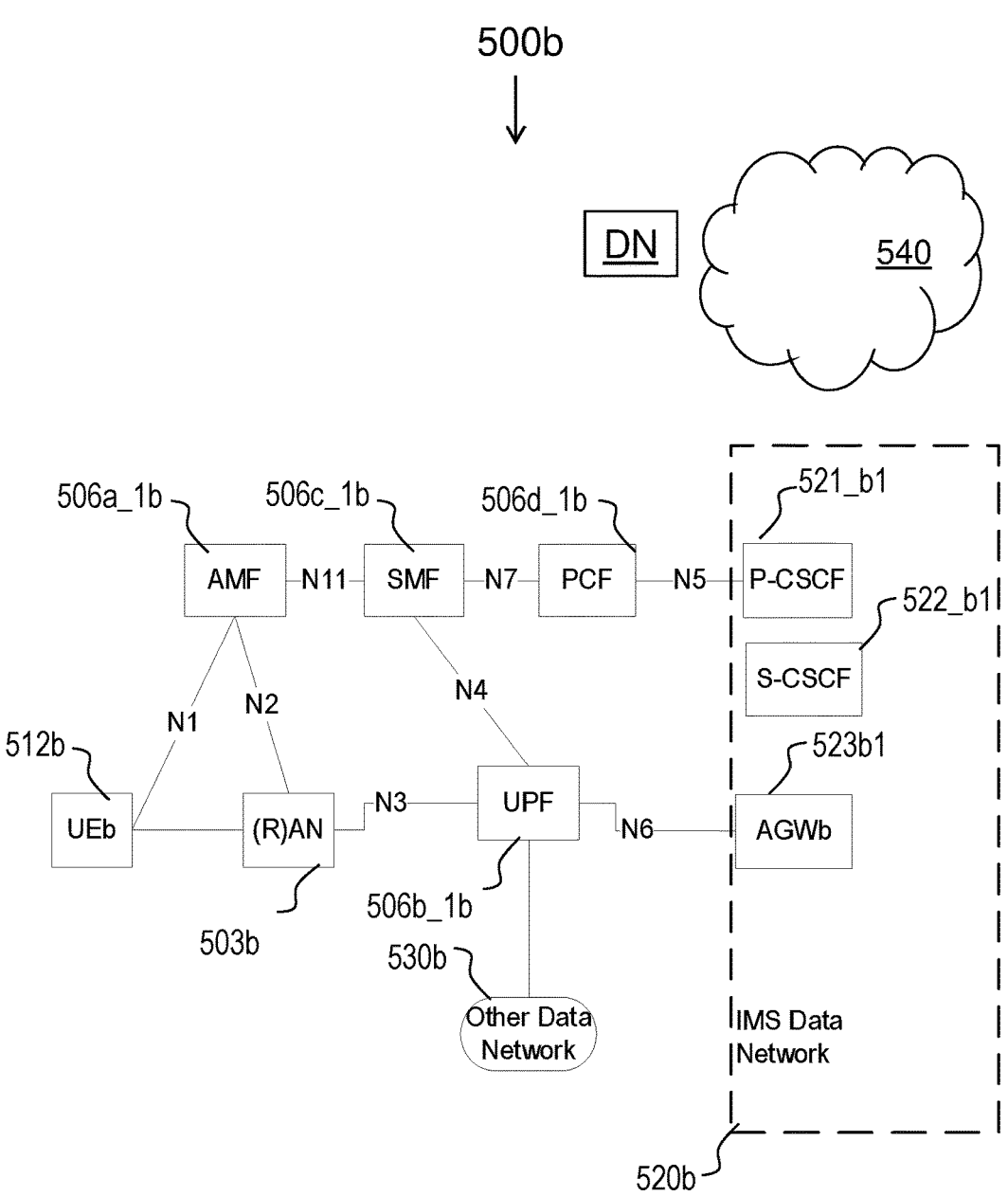
FIG. 5b illustrates a second communications network according to embodiments herein.

FIG. 5b illustrates a second communications network 500b wherein embodiments herein may be implemented. The second communications network 500b may correspond to the terminating network 200b of FIG. 3. The second communications network 500b may comprise components corresponding to the components of the first communications network 500a. In particular, the second communications network 500b comprises one or more access networks, such as a second AN 503b and one or more CNs, such as a second CN.

The CN of the second communications network 500b may be functionally divided into network slices, such as a first network slice NS1b of the second communications network 500b and a second network slice of the second communications network 500b. For simplicity, the second network slice of the second communications network 500b is not illustrated in FIG. 5b. Each network slice of the second communications network 500b comprises one or more CN nodes.

The second communications network 500b may be a wireless communications network or a communications network supporting wireless and wireline convergence, such as 5G Wireless Wireline Convergence.

A number of communications devices operate in the second communications network 500b, such as a second communications device 512b. The second communications device 512b may correspond to the terminating UE 12b of FIG. 3. The second communications device 512b may be a wireless communications device. The same interfaces as defined for the first communications network 500a may also be defined for the second communications network 500b.

In some embodiments the second communications network 500b is the same communications network as the first communications network 500a.

FIGS. 5a and 5b further illustrate an application layer system, such as a first application layer system, also referred to herein as a first application network 520a, associated with or comprised in the first communications network 500a, and a second application layer system, also referred to herein as a second application network 520b, associated with the second communications network 500b. The respective application network 520a, 520b is connected to the respective CN of the respective communications network 500a, 500b. The application network may be an IMS. The application network 520a, 520b comprises one or more application functions, such as the P-CSCF and IMS core functions, such as Serving-Call Session Control Function (S-CSCF), Interrogating-Call Session Control Function I-CSCF, and IMS Application Servers. The application network 520a, 520b further comprises an ATGW that provides an anchor point for a data stream, such as an RTP stream. The ATGW may be co-located with the P-CSCF.

The first application network 520a comprises one or more application nodes. Some of the applications nodes may be associated with a specific network slice. For example, the first application network 520a may comprise a first application node 521a1 and a first core application node 522a1 and a first access gateway 523a1 for providing a service for the first communications device 512a. The first access gateway 523a1 may be implemented as an ATGW. For example, the first application node 521a and the first core application node 522a and the first access gateway 523a1 may each control different aspects of a service session delivering the service, such as an IMS session delivering a voice call, between the first communications device 512a and the second communications device 512b.

The first application node 521a and the first access gateway 523a1 may be associated with the first network slice NS1, while a second application node 521a2 and a second access gateway 523a2 may be associated with the second network slice NS2. The second access gateway 523a2 may be implemented as an ATGW. The first application network 520a may further comprise a second core application node 522a2. The core application nodes are not necessarily associated with a specific network slice.

The second application network 520b also comprises one or more application nodes corresponding to the above-mentioned application nodes for providing a service for the second communications device 512b.

For example, the P-CSCF may be implemented by the first and the second application nodes 521a1, 521a2, while an IMS core function, such as the S-CSCF, may be implemented by the first and second core application nodes 522a1, 522a2. In general, the one or more application nodes may be logical nodes for performing the above-mentioned application functions. Each application node may be implemented in one or more physical nodes or devices.

The IMS may further comprises a multimedia application server, such as a first multimedia application server in the first application network 520a and a second multimedia application server in the second application network 520b.

Generally, an application function interacts with the CN to provide specific services, such as voice, video, gaming, and VR, and may affect routing and/or policy decisions affecting quality of service. An example of an application function is IMS providing voice and video calling services.

The service may be provided to the communications device 512a, 512b through the CN of the communications network 500a, 500b. For example, the service may be provided over a data session, such as a Protocol Data Unit (PDU) session. The data session provides end-to-end user plane connectivity between the communications device 512a, 512b and a specific Data Network 530a, 530b through the user plane node 506b_a, 506b_b. For example, for voice over IMS a PDU session for IMS voice may provide end-to-end user plane connectivity between the first communications device 512a and the second communications device 512b in the second communications network 500b.

A data session, such as a PDU Session, may support one or more QoS Flows. There may be a one-to-one mapping between QoS Flow and QoS profile. For example, for 5G the one-to-one mapping between QoS Flow and QoS profile means that all packets belonging to a specific QoS Flow may have the same 5QI.

The session management nodes 506c_a1, 506c_a2 may control the service session and the associated data session through the N4 interface.

It should be understood by the skilled in the art that "communications device" and "UE" are non-limiting terms which mean any terminal, wireless communication terminal, user equipment, Machine Type Communication (MTC) device, Device to Device (D2D) terminal, or node e.g. smart phone, laptop, mobile phone, sensor, relay, mobile tablets or even a small base station communicating within a cell.

Methods herein may in a first aspect be performed by the first communication device 512a, and in a second aspect by the first application node 521 a1, and in a third aspect by the second application node 521a2.

As an alternative, a Distributed Node (DN) and functionality, e.g. comprised in a first cloud 540a as shown in FIG. 5a, or a second cloud 540b as shown in FIG. 5b, may be used for performing or partly performing the methods.

In the cloud implementation, the functions of anyone or all of the first application node 521a1 and the second application node 521a2, may be deployed in a virtualized environment. The signaling sequences between the nodes or functions does not change if some or all of them are deployed in the cloud.

Exemplifying methods for controlling a service session handover between network slices according to embodiments herein will now be described with reference to FIGS. 6a and 6b and the combined signalling diagrams and flow charts of FIGS. 7a-7c describing interaction between the first communications device 512a, the first application node 521a1 and the second application node 521a2. The combined signalling diagrams and flow charts of FIGS. 7a-7c also illustrates interaction between the first communications device 512a and the first network slice NS1 (FIG. 7a), and interaction between the first communications device 512a and the second network slice NS2 (FIG. 7b), and interactions between the first communications network 500a and the second communications network 500b (FIGS. 7a and 7c). It is to be noted that all nodes that may interact in the methods described below are not shown for simplicity.

The exemplifying methods will also be described with further reference to FIGS. 5a and 5b. The embodiments will be described based on a 5G architecture combined with an IMS. The data session will be exemplified with a PDU IMS session, that is a PDU session for IMS services.

In FIGS. 6a, 6b and 7a-7c the communications devices will be exemplified with UEs, the first and second application nodes 521a1, 521a2 with P-CSCFs and the first and second core application nodes 522a1, 522a2 with S-CSCFs.

Figure 6A:
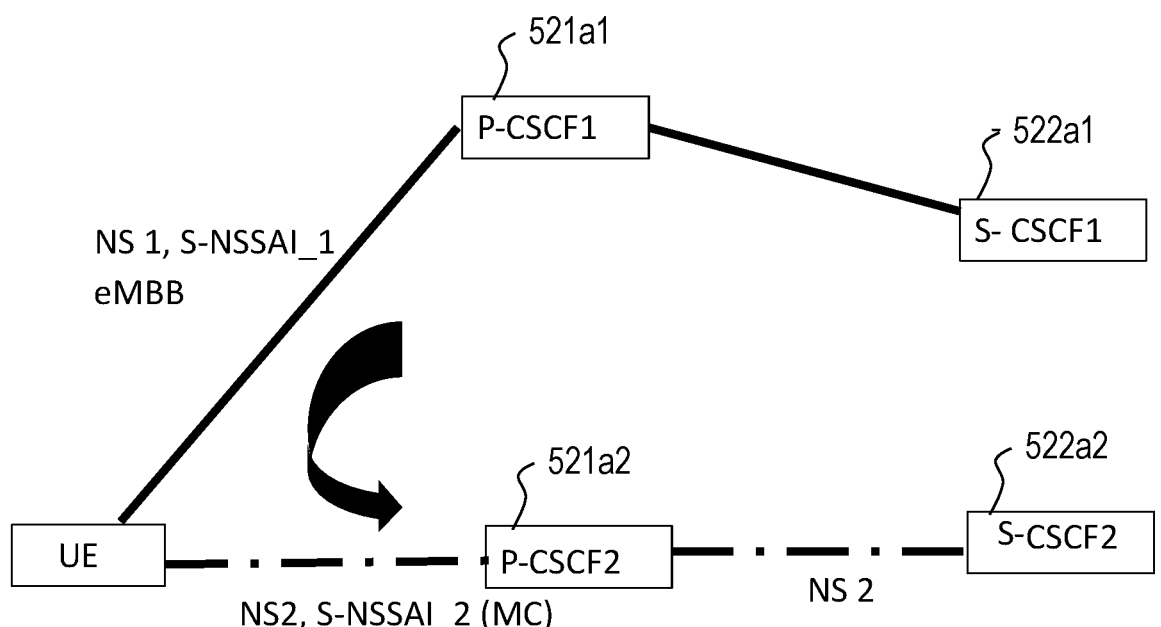
FIG. 6a illustrates an initial setup of services on network slices, FIG. 6b also illustrates services on network slices after handover.
Figure 7A:
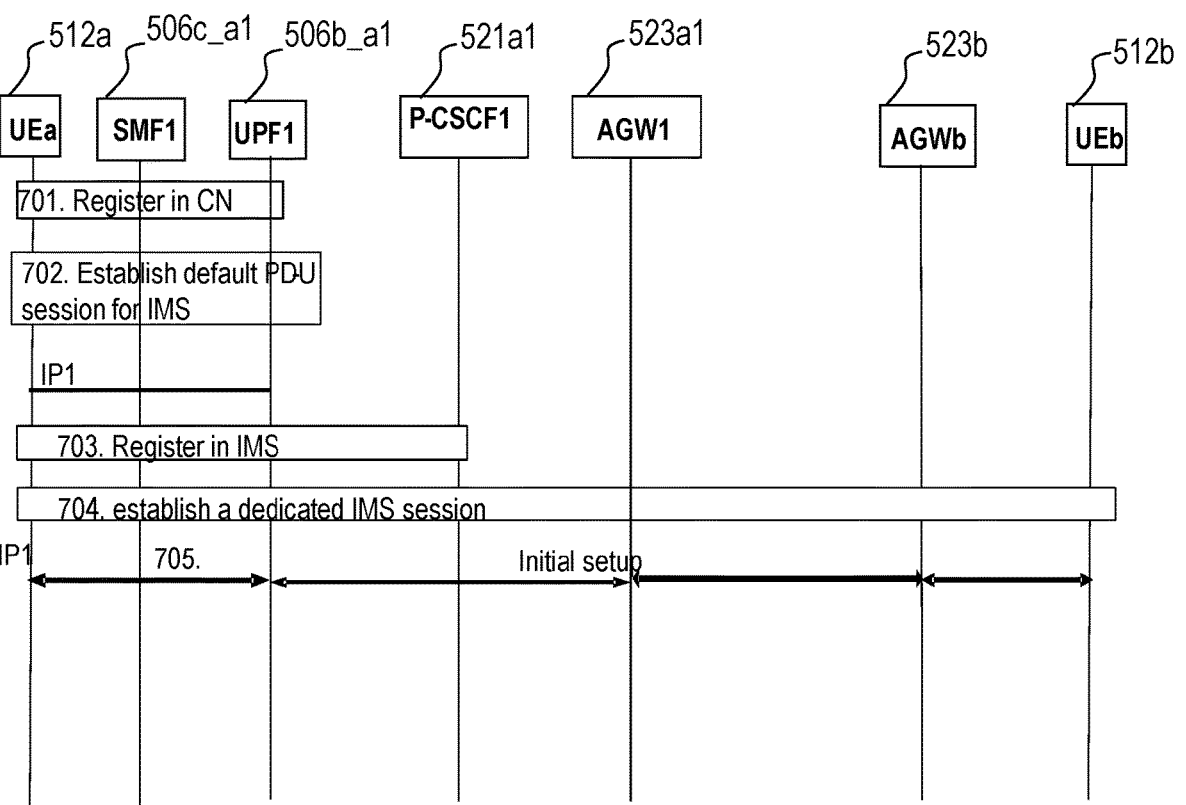
FIG. 7a illustrates details of a method for handing over a service session between network slices according to embodiments herein.

FIG. 6a illustrates a typical example of a UE with two different network slices NS1, NS2 and where each network slice is used to set up some IMS services. The first network slice NS1, used for eMBB, is associated with the first application node 521a1. The first application node 521a1 is associated with a first core application node 522a1.

The second network slice NS2, used for MC, is associated with the second application node 521a2 and a second core network node 522a2.

Different services are indicated with different types of lines between the nodes. A first service, indicated with a solid line, is run over the first network slice NS1, the first application node 521a1 and the first core application node 522a1. A second service, indicated with a hatched-dotted line, is run over the second network slice NS2, the first application node 521*a*1 and the second core application node 522*a*2.

The UE may want to transfer one of the IMS sessions to the second network slice NS2 for MC so that it may terminate the first network slice NS1 for eMBB.

Further, a first network slice identifier S-NSSAI_1 identifies the first network slice NS1, while a second network slice identifier S-NSSAI_2 identifies the second network slice NS2.

Figure 6B:
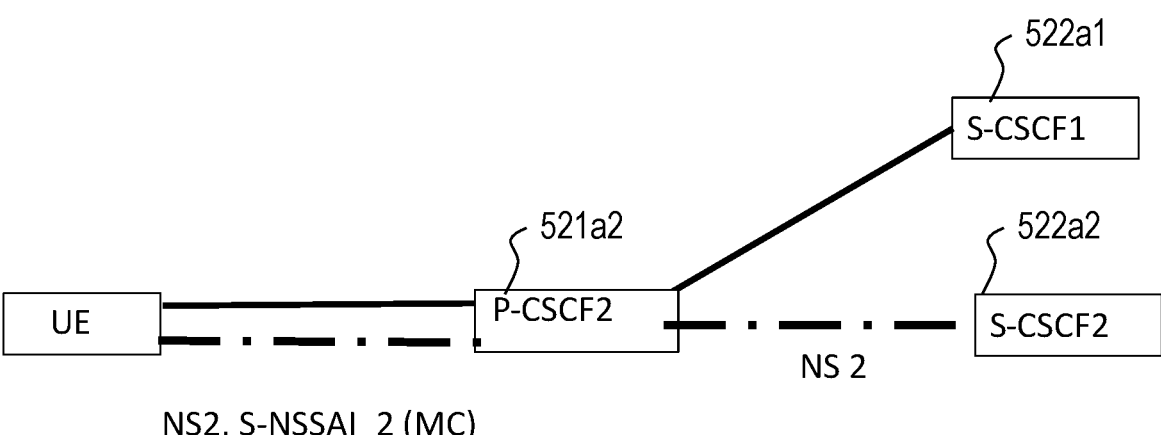

FIG. 6*b* illustrates how the first service has been handed over to the second network slice NS2, and where the first network slice NS1 is terminated. It can be seen that the P-CSCF has changed, but the same S-CSCF being used before is maintained.

Figure 7B:
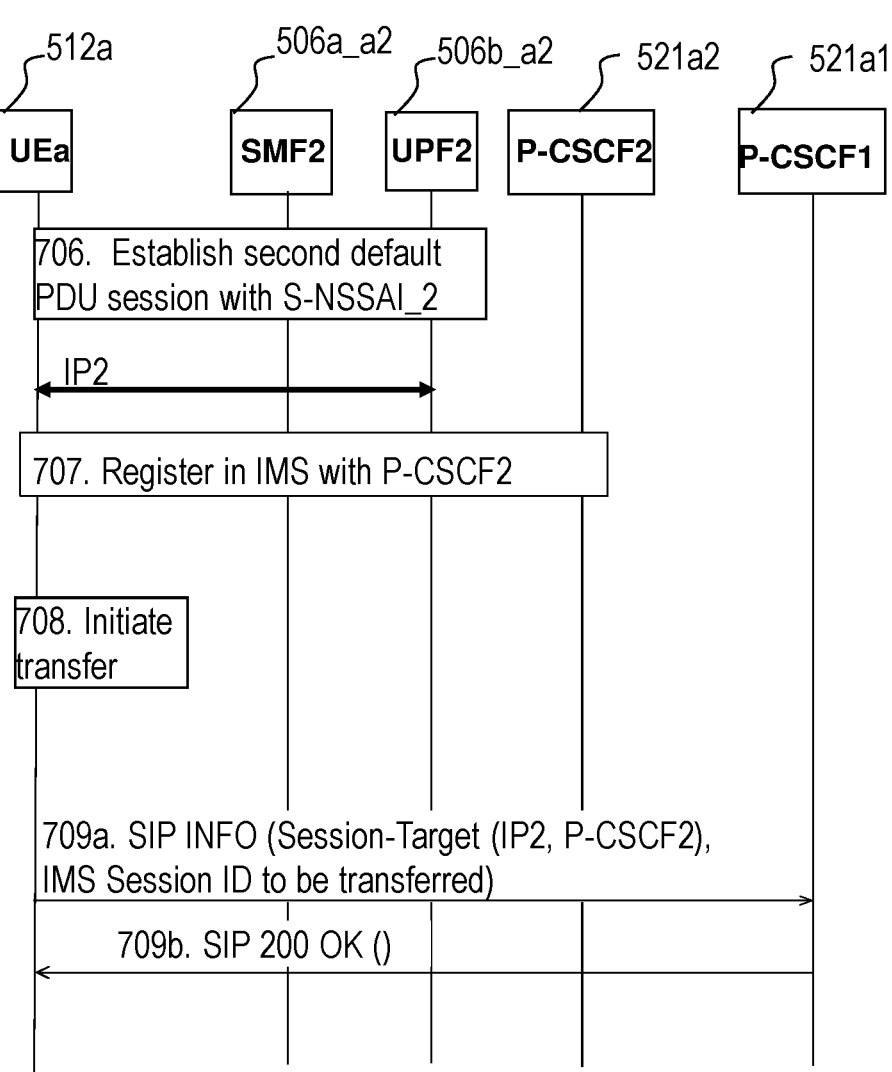
FIG. 7b illustrates further details of a method for handing over a service session between network slices according to embodiments herein.
Figure 7C:
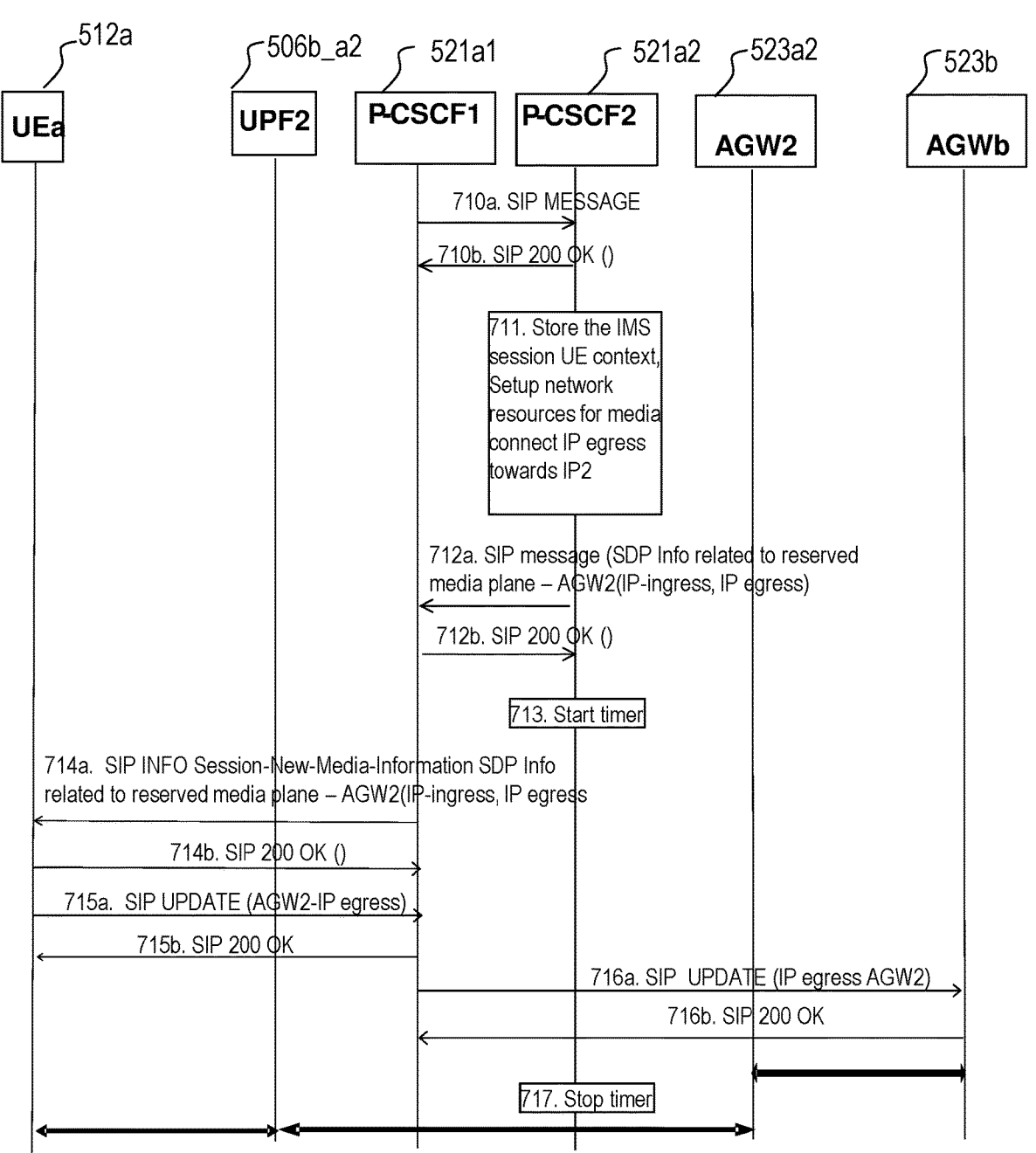
FIG. 7c illustrates yet further details of a method for handing over a service session between network slices according to embodiments herein.

The exemplifying methods disclosed in connection with FIGS. 7*a*-7*c* are described with the assumption that a regular first IMS session, such as a voice session, is first established, then one of the first and second communications devices 512*a*, 512*b* initiates service session handover between network slices.

It is further assumed that the first communications network 500*a* represents the originating side and the second communications network 500*b* represents the terminating side. The following may be a description of actions in a call flow.

FIGS. 7*a*-7*c* show a detailed call flow for seamlessly handing over an IMS session from one network slice to another.

FIG. 7*a* illustrates setting up the first IMS session and the first media path for the IMS session before being handed over to a new network slice.

Action 701

The communications devices 512*a*, 512*b*, such as the first communications device 512*a* and the second communications device 512*b*, may each register in the core network, such as in the 5GC, e.g., according to 3gpp TS 23.502 v. 17.1.0.

Action 702

The communications device 512*a*, 512*b* may establish a first default data session, such as a PDU IMS session, i.e., a PDU session for IMS, e.g., in accordance with 3gpp TS 23.502 v. 17.1.0.

In particular, the first communications device 512*a* may establish the default data session on the first network slice NS1 identified by the first network slice identifier S-NS-SAI_1. The first session management node 506*c*_*a*1 handles the default data session. The first user plane node 506*b*_*a*1 and a first network address IP1 is allocated to the first communications device 512*a*. The default data session between the communications device 512*a*, 512*b* and the first user plane node 506*b*_*a*1 is illustrated with a solid line between action 702 and action 703.

A default service session is established over the default data session with the first communications network 500*a*. For example, a default IMS session may be established over the default PDU session for IMS.

Action 703

The communications device 512*a*, 512*b* registers in IMS, e.g., according to 3gpp TS 23.228 v. 17.1.0 and TS 24.229 v. 17.3.1.

In particular, the first communications device 512*a* registers with the first application node 521*a*1. The first application node 521*a*1 reserves media resources in the first access gateway 523*a*1.

Actions 701 to 703 are valid for both the originating side and the terminating side. Thus, both the first communications device 512*a* and the second communications device 512*b* perform these actions. However, FIG. 7*a* only illustrates them for the first communications device 512*a*.

Action 704

The communications device 512*a*, 512*b* establishes a dedicated IMS session established over a dedicated data session, such as a dedicated PDU IMS session, with another communications device 512*a*, 512*b*. For example, the first communications device 512*a* establishes the dedicated IMS session with the second communications device 512*b*. Each communications device 512*a*, 512*b* establishes its own data session. The IMS session is established over the respective data session. The establishment of the PDU IMS session includes establishing a media path via the first access gateway 523*a*1 and a third access gateway 523*b* associated with the second communications device 512*b*. The third access gateway 523*b* of the second communications device 512*b* may be implemented as an ATGW.

Action 705

When the service session is set up between the communications devices 512*a*, 512*b* the media flows between the communications devices 512*a*, 512*b*. The media flow is shown with thick double-headed arrows after successful step up. The media of the IMS session, which is carried by the PDU IMS session, passes through the first access gateway 523*a*1 and the third access gateway 523*b* associated with the second communications device 512*b*.

FIG. 7*b* illustrates a call flow for initiating the seamless handover of the service session to another network slice.

Action 706

The first communications device 512*a* establishes a new second default data session, such as a second default IMS PDU session, using a second network slice identifier S-NS-SAI_2 and a second session management node 506*c*_*a*2. The first communications device 512*a* is now allocated a second network address IP2, such as a second IP address, and the media flow for the second default data session goes through the second user plane node 506*b*_*a*2. The media flow for the second default data session is illustrated with a solid line between actions 706 and 707 in FIG. 7*b*.

A second default service session is established over the second default data session with the first communications network 500*a*. For example, a second default IMS session may be established over the second default PDU session for IMS.

Action 707

The first communications device 512*a* IMS registers with the second application node 521*a*2 via the second user plane node 506*b*_*a*2.

Action 708

The first communications device 512*a* initiates the transfer of the ongoing IMS session from the first default PDU session to a second default PDU session over the second network slice NS2. This triggers the next action.

Action 709*a*

The first communications device 512*a* sends a SIP INFO message to the first application node 521*a*1 to enable setting up the necessary network resources of the second network slice NS2 for the IMS session to be transferred between the network slices. The SIP INFO message comprises: the second network address IP2 of the first communications device 512*a*, a network address of the second application node 521*a*2, and a session identifier of the first dedicated service session, such as an IMS SIP Session ID of the first dedicated service session. Other information may be possible to include as well, such as charging node, IMS Public Identifier.

Action 709b

The first application node 521a1 may acknowledge the reception of the SIP INFO message by responding to the first communications device 512a with a SIP 200 OK message.

FIG. 7c illustrates a call flow for completing the seamless handover of the service session to another network slice.

Action 710a

The first application node 521a1 sends a SIP MESSAGE to the second application node 521a2. The SIP MESSAGE includes the second network address IP2 of the first communications device 512a, an IMS SIP session UE context stored in the first application node 521a1 to enable the second application node 521a2 to have the complete IMS session info, and a network address of the third access gateway 523b associated with the second communications device 512b. This is done in order to enable the second application node 521a2 to perform network resource reservation for the media and establish the media path with the remote target communications device, such as the second communications device 512b.

The first application node 521a1 may further send other addressing information for the media, such as charging node, IMS Public Identifier.

Action 710b

The second application node 521a2 may acknowledge the reception of the SIP message by responding to the first application node 521a1 with a SIP 200 OK message.

Action 711

The second application node 521a2 stores the IMS PDU session context.

The second application node 521a2 reserves the necessary network resources for the media in the second access gateway 523a2 for the IMS session to be transferred. In other words, the second application node 521a2 further sets up the network resources for the media: an ingress network address and an egress network address of the second access gateway 523a2.

The second application node 521a2 connects the egress network address of the second access gateway 523a2 towards the second network address of the first communications device 512a, for a predetermined, preferably short, time. If media is not received on the second service session, that is on the egress and/or ingress network address of the second access gateway 523a2 within that time the second service session may be abandoned.

Action 712a

The second application node 521a2 sends to the first application node 521a1 a SIP MESSAGE with the information about the network address of the second access gateway 523a2, that is the ingress address and the egress address. This is done in order for the first application node 521a1 to be able to forward this information to the first communication device 512a.

Action 712b

The first application node 521a1 may acknowledge the reception of the SIP message by responding to the second application node 521a2 with a SIP 200 OK message.

Action 713

The second application node 521a2 establishes a timer to ensure that the established media path between the second communications device 512b and the first communications device 512a is used within a certain time. If the first communications device 512a abandons the IMS session or something goes wrong, the second application node 521a2 may undo the established network resource reservation for the media such that it is not accessible to other parties.

The second application node 521a2 starts the timer for media flow to start.

Action 714a

The first application node 521a1 sends a SIP INFO message to the first communications device 512a with information about the network address of the second access gateway 523a2, that is the ingress address and the egress address. This enables the first communications device 512a to send media over the second service session on the second network slice NS2, that is over the second media path.

Action 714b

The first communications device 512a may acknowledge the reception of the SIP message by responding to the first application node 521a1 with a SIP 200 OK message.

Action 715a

The first communications device 512a initiates the final media transfer by sending a SIP UPDATE, comprising the egress network address of the second access gateway 523a2, to the first application node 521a1.

Action 715b

The first application node 521a1 may acknowledge the reception of the SIP UPDATE by responding to the first communications device 512a with a SIP 200 OK message.

Action 716a

The first application node 521a1 sends a SIP UPDATE, comprising the egress network address of the second access gateway 523a2, to the remote third access gateway 523b of the second communications device 512b. This is done to update the stored network address of the access gateway of the first communications device 512a to match the network address of the second access gateway 523a2.

Action 716b

The remote third access gateway 523b may acknowledge the reception of the SIP message by responding to the first application node 521a1 with a SIP 200 OK message.

Action 717

The media from the remote end starts to go through the new media path which is via the third access gateway 523b of the second communications device 512b, the second access gateway 523a2 and the second user plane node 506b_a2. The second application node 521a2 stops the timer, after media is detected and reported to second application node 521a2.

IMS session transfer is complete.

The first communications device 512a should handle the short transition between the network slices and be able to ensure the media is continuous while it handles both the media on the first network address IP1 and the second network address IP2.

Note that while SIP has been used above as an example of the messaging between the application nodes for transferring the above-described information, other protocols may be used to transfer this information.

Exemplifying methods according to embodiments herein will now be described with reference to flowcharts of FIGS. 8-10 and with further reference to FIGS. 5a and 5b. The flowcharts of FIGS. 8-10 complement the above-described signalling diagrams and describe exemplifying methods according to embodiments herein from a node perspective. Thus, FIGS. 8-10 describe methods performed by the first communications device 512a, and the first and second application nodes 521a1, 521a2.

The methods are for controlling a service session handover between network slices.

In some embodiments the application network 520a, 520b is an Internet Protocol-based multimedia system, such as IMS, providing the service to the communications devices

512a, 512b, such as providing a media of a media type. Thus, the first and second dedicated service sessions may each be a dedicated IMS session. The first and second default service sessions may each be a default IMS session.

Media types of the service sessions may, for example, be any one or more out of: voice, video, real-time gaming, Virtual Reality, VR, Augmented Reality, AR, and Mixed Reality, MR. In general, the service session may be a real-time service session. The data sessions may be real-time data sessions.

The methods comprises one or more of the following actions, which actions may be taken in any suitable order.

Figure 8:
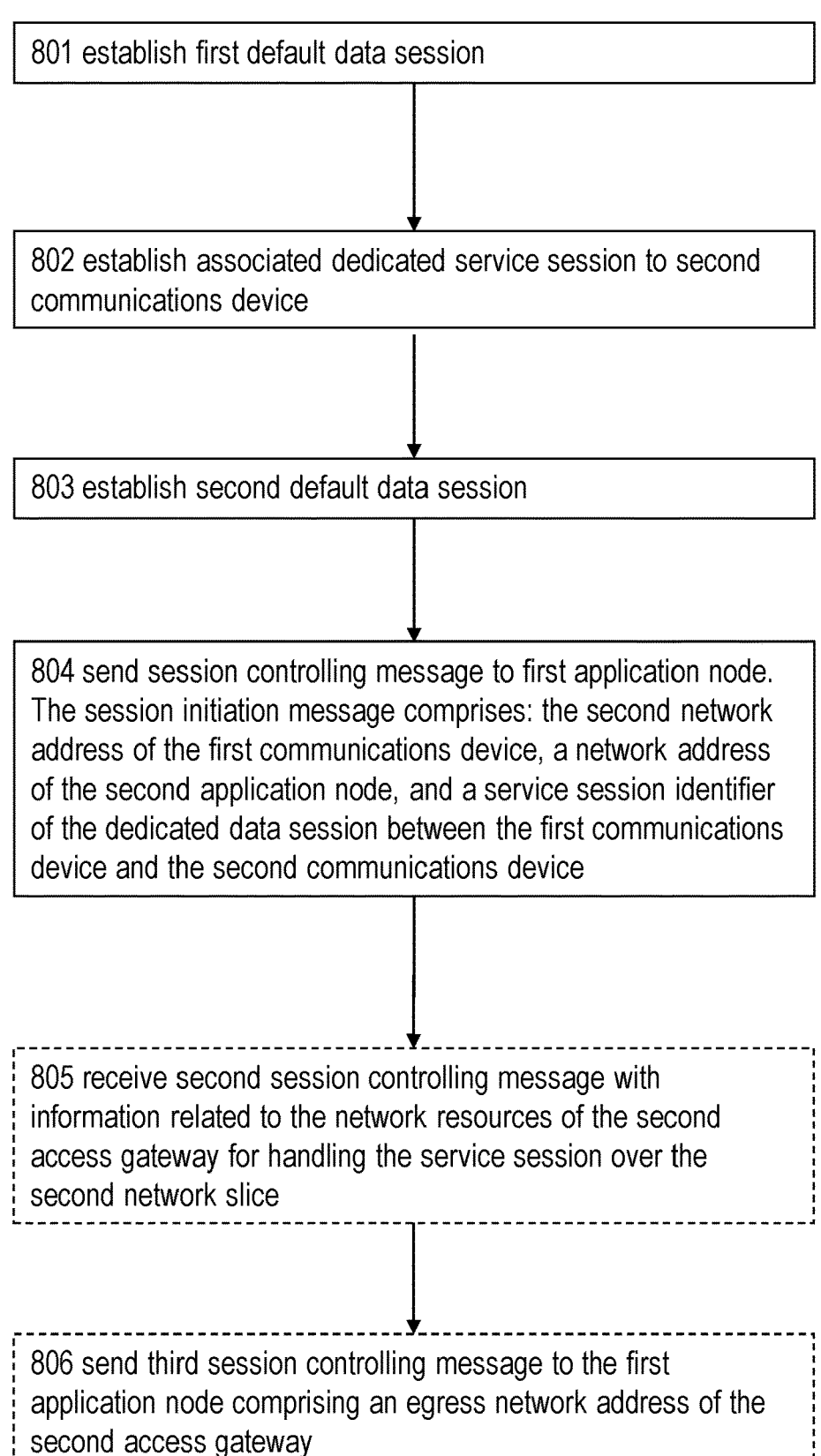
FIG. 8 is a flow chart and illustrates a method for handing over a service session between network slices according to embodiments herein.

FIG. 8 illustrates example methods performed by the first communications device 512a.

As mentioned above, the communications network 500 may be a 5G network.

The application layer system 520a may be an Internet Protocol, IP, Multimedia Subsystem, IMS. The data session may be a PDU session for IMS.

Action 801

The first communications device 512a establishes the first default data session on the first network slice NS1 of the communications network 500 based on the first network slice identifier S-NSSAI_1 of the first network slice NS1 such that the first network address IP1 of the first communications device 512a, the first application node 521a1 of an application layer system 520a, and the first access gateway 523a1 of the application layer system 520a is associated with the first default data session.

Action 801 is related to action 702 of FIG. 7a.

Action 802

The first communications device 512a establishes an associated first dedicated service session with the second communications device 512b over the first dedicated data session based on the first default data session on the first network slice NS1.

Action 802 is related to action 704 of FIG. 7a.

Action 803

The first communications device 512a may want to transfer services established over the first dedicated data session to the second network slice NS2, for example so that it may terminate the first network slice NS1.

Therefore, the first communications device 512a establishes the second default data session on the second network slice NS2 of the communications network 500 based on the second network slice identifier S-NSSAI_2 of the second network slice NS2 such that the second network address IP2 of the first communications device 512a, the second application node 521a2 of the application layer system 520a, and the second access gateway 522_a2 of the application layer system 520a is associated with the second default data session.

The second default service session may be established over the second default data session with the first communications network 500a. For example, a second default IMS session may be established over the second default PDU session for IMS.

In some embodiments the second application node 521a2 is the same application node as the first application node 521a1.

The first and second network slice identifiers S-NSSAI_1, S-NSSAI_2 may both be part of an access network subscription profile of the first communications device 512a.

Action 803 is related to action 706 of FIG. 7b.

Action 804

In order to initiate the handover of the first dedicated service session from the first network slice NS1 to the second network slice NS2 the first communications device 512a then sends a session controlling message to the first application node 521a1. The session controlling message controls the service session. The controlling message may be a SIP message. Generally, in embodiments herein different session controlling messages may be implemented with different SIP messages.

The session controlling message comprises: the second network address IP2 of the first communications device 512a, the network address of the second application node 521a2, and the session identifier of the first dedicated service session, to enable reserving network resources of the second access gateway 522_a2 for the second dedicated service session between the first communications device 512a and the second communications device 512b established over the second dedicated data session based on the second default data session on the second network slice NS2, such that handover of the first dedicated service session between the first network slice NS1 and the second network slice NS2 is enabled.

The network resources of the second access gateway 522_a2 may comprise an ingress network address and an egress network address for the second dedicated service session on the second network slice NS2.

The respective first and second default data session may be a default PDU session for IMS. The respective first and second dedicated data session may be a dedicated PDU session for IMS. The respective first and second dedicated service session may be a dedicated IMS session established over the associated first and second dedicated PDU session. The network address may be an IP address. The session identifier may be an IMS SIP session identifier for identifying the first dedicated service session. The transmitted session controlling message may be a SIP INFO message comprising the IMS SIP session identifier of the dedicated IMS session.

Action 804 is related to actions 709 of FIG. 7b.

Action 805

The first communications device 512a may receive, from the first application node 521a1, a second session controlling message with information related to the network resources of the second access gateway 522_a2. The network resources of the second access gateway 522_a2 comprises an egress network address of the second access gateway 522_a2. The first communications device 512a may receive the information related to the network resources of the second access gateway 522_a2 for controlling the second dedicated service session on the second network slice NS2.

The second session controlling message may be a SIP INFO message.

Action 805 is related to action 714 of FIG. 7c.

Action 806

The first communications device 512a may send a third session controlling message to the first application node 521a1 comprising the egress network address of the second access gateway 522_a2 to initiate the handover of the service session, that is to initiate the media transfer.

The third session controlling message may be a SIP UPDATE message.

Action 806 is related to action 715 of FIG. 7c.

FIG. 9 illustrates example methods, performed by the first application node 521a1 of an application layer system 520a controlling data sessions, for controlling the service session handover between network slices.

In some embodiments herein the application layer system 520a is an IMS, the respective data session is a PDU session for IMS, and the context of the first dedicated service session is an established IMS Session context.

The method comprises one or more or the following actions.

Action 901

The first application node 521a1 establishes the first dedicated service session between the first communications device 512a and the second communications device 512b over the first default data session of the first communications device 512a on the first network slice NS1 of the communications network 500.

Action 901 is related to action 704 of FIG. 7a.

Action 902

The first application node 521a1 receives, from the first communications device 512a, a session controlling message comprising: the second network address IP2 of the first communications device 512a, the network address of the second application node 522_a2 associated with the second default data session of the first communications device 512a established over the second network slice NS2 of the communications network 500, and the session identifier of the first dedicated service session, to enable reserving network resources of the second access gateway 522_a2 for the second dedicated service session between the first communications device 512a and the second communications device 512b such that handover of the first dedicated service session between the first network slice NS1 and the second network slice NS2 is enabled.

Action 902 is related to action 709 of FIG. 7b.

Action 903

Based on the contents of the received session controlling message, the first application node 521a1 sends the second session controlling message to the second application node 521a2. Note that this is not the same second controlling message as in action 805. This is the second session controlling message that is handled by the first application node 521a1.

The second session controlling message comprises:

a) the second network address IP2 of the first communications device 512a, b) a context of the first dedicated service session, c) the network address of an access gateway 522_b serving the second communications device 512b.

The first application node 521a1 sends the second session controlling message to the second application node 521a2 to enable the second application node 521a2 to perform network resource reservation and establish a data path with the second communications device 512b for the second dedicated service session between the first communications device 512a and the second communications device 512b, such that handover of the first dedicated service session between the first network slice NS1 and the second network slice NS2 is enabled.

The second session controlling message may further comprise other network address information related to a data path of the second dedicated service session.

Action 903 is related to action 710 of FIG. 7c.

Action 904

The first application node 521a1 may receive, from the second application node 521a2, a third session controlling message with information related to the reserved network resources of the second access gateway 522_a2.

Action 904 is related to action 712 of FIG. 7c.

Action 905

The first application node 521a1 may send a fourth session controlling message to the first communications device 512a with the received information related to the reserved network resources of the second access gateway 522_a2.

Action 905 is related to action 714 of FIG. 7c.

Action 906

The first application node 521a1 may further receive, from the first communications device 512a, a fifth session controlling message comprising an egress network address of the second access gateway 522_a2. This corresponds to step 715a in FIG. 7c Action 907

In some embodiments the first application node 521a1 sends a sixth session controlling message to the third access gateway 523b serving the second communications device 512b to update a stored network address of an access gateway associated with the first communications device 512a to match the network address of the second access gateway 522_a2 to enable the media to be connected to the first communications device 512a. For example, the sixth session controlling message may be a SIP UPDATE, comprising the egress network address of the second access gateway 523a2, to the remote third access gateway 523b of the second communications device 512b. This corresponds to step 716a in FIG. 7c.

FIG. 10 illustrates example methods, performed by the second application node 521a2 of the application layer system 520a controlling data sessions, for controlling a dedicated service session handover between the first network slice NS1 and the second network slice NS2. For example, handover between two IMS sessions may be controlled. The two IMS sessions may be established over two different PDU sessions for IMS that are using different network slices.

The method is at least partly performed during the first dedicated service session between the first communications device 512a and the second communications device 512b over the first dedicated data session based on the first default data session of the first communications device 512a on the first network slice NS1 of the communications network 500a comprising the first and the second network slices NS1, NS2. The first default service session is based on the first network slice identifier S-NSSAI_1 such that the first network address IP1 of the first communications device 512a, the first application node 521a1 of the application layer system 520a, and the first access gateway 522a1 of the application layer system 520a is associated with the first default data session.

For example, actions 1001 to 1003 below may be performed during the first dedicated service session between the first communications device 512a and the second communications device 512b.

The methods comprise one or more or the following actions.

Action 1001

The second application node 521a2 registers the first communications device 512a in the application layer system 520a for the second default service session to be established over the second default data session, based on the second network slice identifier S-NSSAI2 such that the second network address IP2 of the first communications device 512a, the second application node 521a2, and the second access gateway 522_a2 is associated with the second default service session.

Action 1001 is related to action 707 of FIG. 7b.

Action 1002

The second application node 521a2 receives, from the first application node 521a1 associated with the first network slice NS1 and controlling the first dedicated data session, a session controlling message comprising:

a) the second network address IP2 of the first communications device 512a;

b) the context of the first dedicated service session; and c) the network address of an access gateway 522b serving the second communications device 512b.

The second application node 521a2 receives the session controlling message to enable the second application node 521a2 to perform network resource reservation and establish the data path with the second communications device 512b for the second dedicated service session between the first communications device 512a and the second communications device 512b, such that handover of the first dedicated service session between the first network slice NS1 and the second network slice NS2 is enabled.

Action 1002 is related to action 710 of FIG. 7c.

Action 1003

In some embodiments the second application node 521a2 stores the context of the first dedicated service session.

Action 1003 is related to action 711 of FIG. 7c.

Action 1004

The second application node 521a2 reserves network resources of the second access gateway 522_a2 for the first dedicated service session to be transferred to the second dedicated service session. The reservation is based on the received session controlling message.

Action 1101 is related to action 711 of FIG. 7c.

Action 1005

The second application node 521a2 sends a second session controlling message, with information related to the reserved network resources of the second access gateway 522_a2, to the first application node 521a1.

Action 1102 is related to action 712 of FIG. 7c.

Action 1006

The second application node 521a2 may then connect an egress network address of the second access gateway 522_a2 towards the second network address IP2 of the first communications device 512a, for a predetermined time.

Action 1001 is related to action 711 of FIG. 7c.

Action 1007

In some embodiments the second application node 521a2 starts a timer for the predetermined time.

Action 1002 is related to action 713 of FIG. 7c.

Action 1008a

If the second application node 521a2 started the timer in action 1007 above, then the second application node 521a2 may stop the timer if data is received over the second dedicated service session within the predetermined time.

Action 1008a is related to action 717 of FIG. 7c.

Action 1008b

In some embodiments the second application node 521a2 abandons the reserved resources for the second dedicated service session if data is not received over the second dedicated service session within the predetermined time. That is, IP ingress and IP egress of the second access gateway 523a2 may be abandoned.

Figure 11:
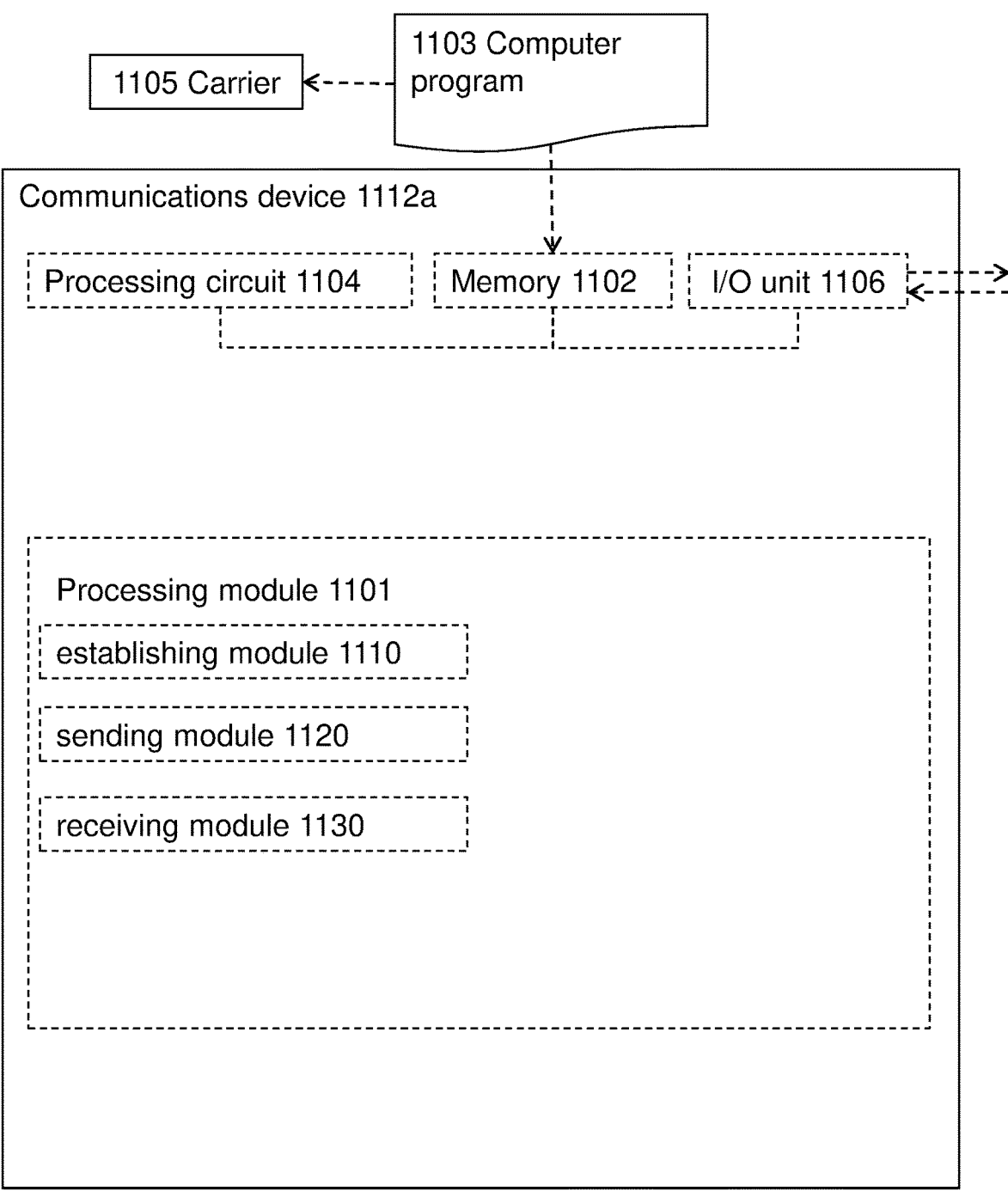
FIG. 11 illustrates a communications device for handing over a service session between network slices according to embodiments herein.

FIG. 11 illustrates a schematic block diagram of embodiments of the first communications device 512a. The first communications device 512a may be adapted to control the dedicated service session handover between network slices.

The first communications device 512a may comprise a processing module 1101 for performing the above method actions. The processing module 1101 may comprise an establishing module 1110 to, e.g. establish different data session.

Thus, the first communications device 512a is configured to, e.g. by means of the establishing module 1110, establish the first default data session on the first network slice NS1 of the communications network 500a based on the first network slice identifier S-NSSAI_1 of the first network slice NS1, such that the first network address of the first communications device 512a, the first application node 521a1 of the application layer system 520a, and the first access gateway 522a1 of the application layer system 520a is associated with the first default data session.

The first communications device 512a is further configured to, e.g. by means of the establishing module 1110, establish the associated first dedicated service session with the second communications device 512b over the first dedicated data session based on the first default data session on the first network slice NS1.

The first communications device 512a is further configured to, e.g. by means of the establishing module 1110, establish the second default data session on the second network slice NS2 of the communications network 500a based on the second network slice identifier S-NSSAI_2 of the second network slice NS2, such that the second network address IP2 of the first communications device 512a, the second application node 521a2 of the application layer system 520a, and the second access gateway 522_a2 of the application layer system 520a is associated with the second default data session.

The processing module 1201 may comprise a sending module 1120 to, e.g. send different messages. Thus, the first communications device 512a is configured to, e.g. by means of the sending module 1120, send the session controlling message to the first application node 521a1. The session controlling message comprises: the second network address IP2 of the first communications device 512a, the network address of the second application node, and the session identifier of the first dedicated service session, to enable reservation of network resources of the second access gateway 522_a2 for the second dedicated service session between the first communications device 512a and the second communications device 512b established over the second dedicated data session based on the second default data session on the second network slice, such that handover of the first dedicated service session between the first network slice NS1 and the second network slice NS2 is enabled.

The processing module 1201 may comprise a receiving module 1130. Thus, the first communications device 512a is configured to, e.g. by means of the receiving module 1130, receive the second session controlling message from the first application node 521a1. The second session controlling message comprises information related to the network resources of the second access gateway 522_a2, comprising an egress network address of the second access gateway 522_a2, for control of the second dedicated service session on the second network slice.

The first communications device 512a may be configured to, e.g. by means of the sending module 1120, send the third session controlling message to the first application node 521a1 comprising the egress network address of the second access gateway 522_a2 to initiate the handover of the service session.

Figure 12:
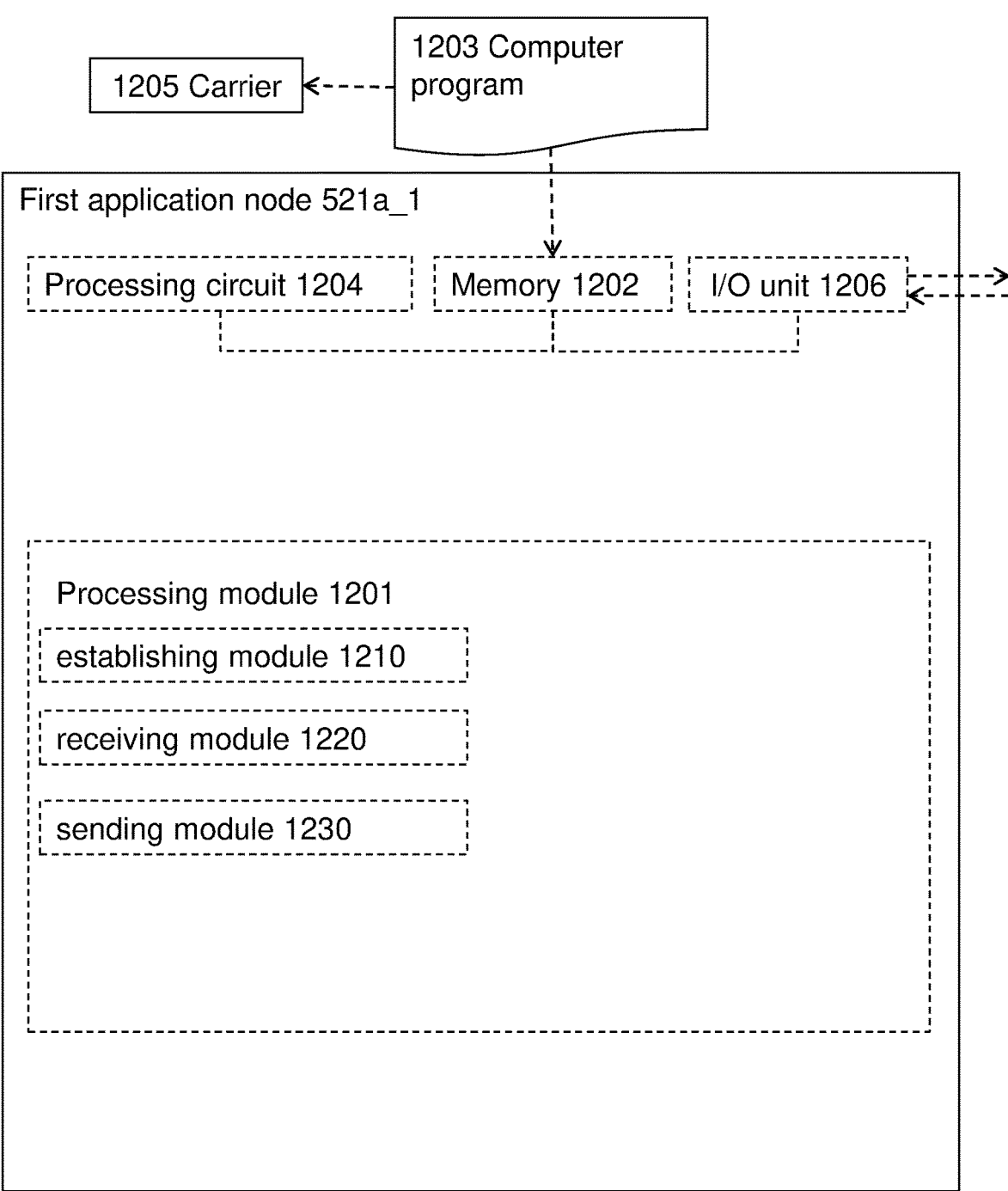
FIG. 12 illustrates a first application node for handing over a service session between network slices according to embodiments herein.

FIG. 12 illustrates a schematic block diagram of embodiments of the first application node 521a1 of the application layer system 520a controlling data sessions, for controlling the service session handover between network slices.

The first application node 521a1 may comprise a processing module 1201 for performing the above method actions. The processing module 1201 may comprise an establishing module 1210 to, e.g. establish the service session, such as an IMS session.

Thus, the communications device 512a, 512b is configured to, e.g. by means of the establishing module 1210, establish the first dedicated service session between the first communications device 512a and the second communications device 512b based on the first default data session of the first communications device 512a on the first network slice NS1 of the communications network 500a.

The processing module 1301 may comprise a receiving module 1220 to, e.g. receive different messages.

Thus, the first application node 521a1 is configured to, e.g. by means of the receiving module 1220, receive, from the first communications device 512a, a session controlling message comprising: the second network address IP2 of the first communications device 512a, the network address of the second application node 522_a2 associated with the second default data session of the first communications device 512a established over the second network slice NS2 of the communications network 500a, and the session identifier of the first dedicated service session, to enable reservation of network resources of the second access gateway 522_a2 for the second dedicated service session between the first communications device 512a and the second communications device 512b based on the second default data session, such that handover of the first dedicated service session between the first network slice NS1 and the second network slice NS2 is enabled.

The first application node 521a1 may comprise a sending module 1230.

The first application node 521a1 is further configured to, e.g. by means of the sending module 1230, send the second session controlling message to the second application node 521a2 based on the contents of the received session controlling message. That is, the second session controlling message may be sent in response to the received session controlling message, and the contents of the second session controlling message may be based on the contents of the received session controlling message. The second session controlling message comprises:

a) the second network address IP2 of the first communications device 512a, b) the context of the first dedicated service session, c) the network address of an access gateway 522_b serving the second communications device 512b, to enable the second application node 521a2 to perform network resource reservation and establish the data path with the second communications device 512b for the second dedicated service session between the first communications device 512a and the second communications device 512b, such that handover of the first dedicated service session between the first network slice NS1 and the second network slice NS2 is enabled.

The first application node 521a1 may further be configured to, e.g. by means of the receiving module 1220, receive from the second application node 521a2, the third session controlling message with information related to the reserved network resources of the second access gateway 522_a2.

Then the first application node 521a1 may further be configured to, e.g. by means of the sending module 1230, send the fourth session controlling message to the first communications device 512a with the received information related to the reserved network resources of the second access gateway 522_a2.

The first application node 521a1 may further be configured to, e.g. by means of the receiving module 1220, receive from the first communications device 512a, the fifth session controlling message comprising an egress network address of the second access gateway 522_a2.

Then the first application node 521a1 may further be configured to, e.g. by means of the sending module 1230, send the sixth session controlling message to the access gateway, adapted to serve the second communications device 512b, to update the stored network address of an access gateway associated with the first communications device 512a to match the network address of the second access gateway 522_a2.

In some embodiments the application layer system 520a is an IMS, the data session is a PDU session for IMS, and the context of the first dedicated service session is an IMS session context of the dedicated IMS session.

In some other embodiments the second session controlling message further comprises other network address information related to the data path of the second dedicated service session.

Figure 13:
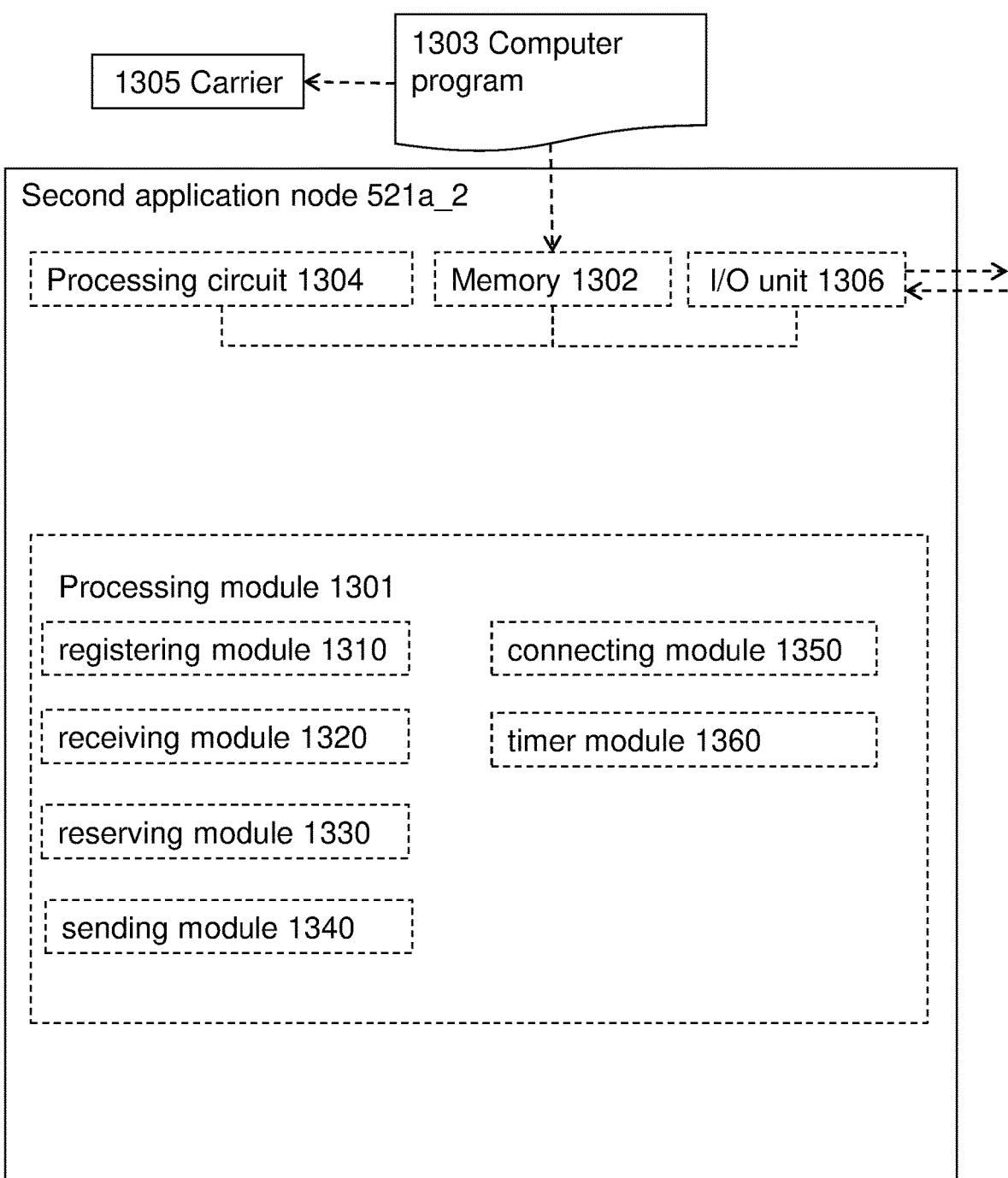
FIG. 13 illustrates a second application node for handing over a service session between network slices according to embodiments herein.

FIG. 13 illustrates a schematic block diagram of embodiments of the second application node 521a2 of the application layer system 520a, for controlling the dedicated service session handover between the first network slice NS1 and the second network slice NS2, The service session handover is the handover of the first dedicated service session between the first communications device 512a and the second communications device 512b. The first dedicated service session is established over the first dedicated data session. The first dedicated data session is based on the first default data session of the first communications device 512a on the first network slice NS1 of the communications network 500a comprising the first and the second network slices NS1, NS2. The first default data session is based on the first network slice identifier S-NSSAI_1 such that the first network address IP1 of the first communications device 512a, the first application node 521a1 of the application layer system 520a, and the first access gateway 522a1 of the application layer system 520a is associated with the first default data session.

The second application node 521a2 may comprise a processing module 1301 for performing the above method actions. The processing module 1301 may comprise a registering module 1310 to, e.g. register communications devices in the application layer system 520a.

Thus, the second application node 521_a2 is configured to, e.g. by means of the registering module 1310, register the first communications device 512a in the application layer system 520a for the second default service session to be established over the second default data session, based on the second network slice identifier S-NSSAI2 such that the second network address IP2 of the first communications device 512a, the second application node 521a2, and the second access gateway 522_a2 is associated with the second default service session.

The processing module 1301 may further comprise a receiving module 1320. Thus, the application node 521a, 521b is configured to, e.g. by means of the receiving module 1320, receive, from the first application node 521a1 associated with the first network slice NS1 and controlling the first dedicated service session, the session controlling message comprising:

a) the second network address IP2 of the first communications device 512a;

b) the context of the first dedicated service session;

c) the network address of an access gateway 522b serving the second communications device 512b, to enable the second application node 521*a*2 to perform network resource reservation and establish the data path with the second communications device 512*b* for the second dedicated service session between the first communications device 512*a* and the second communications device 512*b*, such that handover of the first dedicated service session between the first network slice NS1 and the second network slice NS2 is enabled.

The processing module 1301 may further comprise a reserving module 1330. Thus, the second application node 521_*a*2 is configured to, e.g. by means of the reserving module 1330, reserve network resources of the second access gateway 522_*a*2 for the first dedicated service session to be transferred to the second dedicated service session based on the received session controlling message.

The processing module 1301 may further comprise a sending module 1340. The second application node 521_*a*2 is configured to, e.g. by means of the sending module 1340, send to the first application node 521*a*1 the second session controlling message with information related to the reserved network resources of the second access gateway 522_*a*2.

The second application node 521_*a*2 may further comprise a memory 1302.

In some embodiments the second application node 521_*a*2 is configured to, e.g. by means of the memory 1302, store the context of the first dedicated service session.

The processing module 1301 may further comprise a connecting module 1350. In some embodiments the second application node 521_*a*2 is configured to, e.g. by means of the connecting module 1350, connect an egress network address of the second access gateway 522_*a*2 towards the second network address IP2 of the first communications device 512*a*, for the predetermined time.

The processing module 1301 may further comprise a timer module 1360. In some embodiments the second application node 521_*a*2 is configured to, e.g. by means of the timer module 1360, start the timer for the predetermined time.

The second application node 521_*a*2 may further be configured to, e.g. by means of the timer module 1360, stop the timer if data is received over the second dedicated service session within the predetermined time.

In some embodiments the second application node 521_*a*2 is configured to, e.g. by means of the reserving module 1330, abandon the reserved resources for the second dedicated service session if data is not received over the second dedicated service session within the predetermined time.

The first communications device 512*a*, and the first and second application nodes 521*a*1, 521*a*2 may comprise a respective input and output unit, 1106, 1206, and 1306 configured to communicate with each other. The input and output unit may comprise a receiver (not shown) and a transmitter (not shown).

The embodiments herein may be implemented through a respective processor or one or more processors, such as the respective processing circuit 1104, 1204, and 1304 in the first communications device 512*a*, and the first and second application nodes 521*a*1, 521*a*2 depicted in FIGS. 11-13, together with computer program code for performing the functions and actions of the embodiments herein. The program code mentioned above may also be provided as a computer program product, for instance in the form of a data carrier carrying computer program code for performing the embodiments herein when being loaded into the respective the first communications device 512*a*, and the first and second application nodes 521*a*1, 521*a*2. One such carrier may be in the form of a CD ROM disc. It is however feasible with other data carriers such as a memory stick. The computer program code may furthermore be provided as pure program code on a server or a cloud and downloaded to the first communications device 512*a*, and the first and second application nodes 521*a*1, 521*a*2.

The first communications device 512*a*, and the first and second application nodes 521*a*1, 521*a*2 may further comprise a respective memory 1102, 1202, and 1302 comprising one or more memory units. The memory comprises instructions executable by the processor in the first communications device 512*a*, and the first and second application nodes 521*a*1, 521*a*2.

Each respective memory 1202, 1302, 1402 and 1502 is arranged to be used to store e.g. information, data, configurations, and applications to perform the methods herein when being executed in the first communications device 512*a*, and the first and second application nodes 521*a*1, 521*a*2.

In some embodiments, a respective computer program 1103, 1203, and 1303 comprises instructions, which when executed by the at least one processor, cause the at least one processor of the respective first communications device 512*a*, and the first and second application nodes 521*a*1, 521*a*2 to perform the actions above.

In some embodiments, a respective carrier 1105, 1205, and 1305 comprises the respective computer program, wherein the carrier is one of an electronic signal, an optical signal, an electromagnetic signal, a magnetic signal, an electric signal, a radio signal, a microwave signal, or a computer-readable storage medium.

Those skilled in the art will also appreciate that the modules and units described above may refer to a combination of analog and digital circuits, and/or one or more processors configured with software and/or firmware, e.g. stored in the respective first communications device 512*a*, and the first and second application nodes 521*a*1, 521*a*2, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Figure 14:
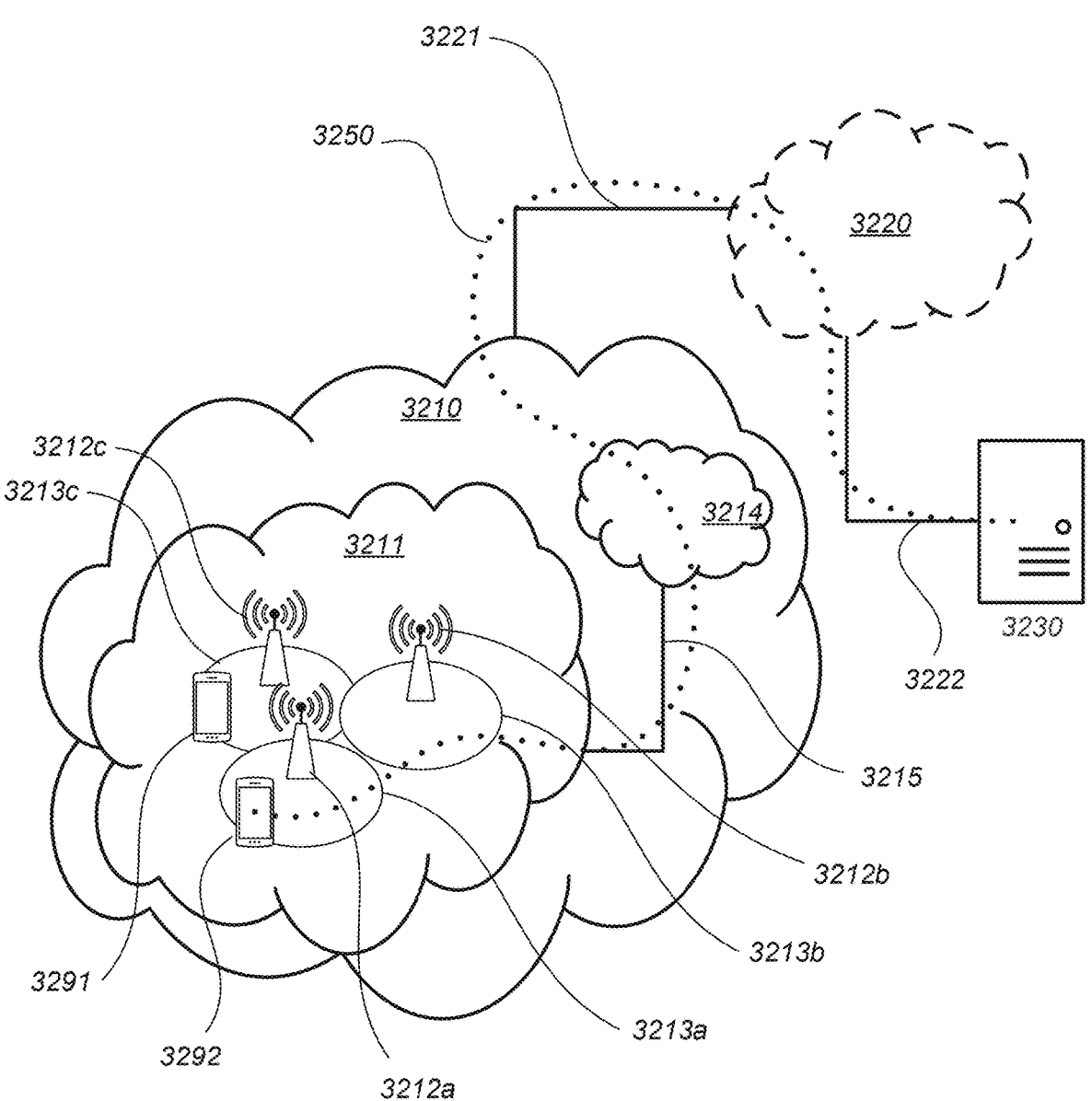
FIG. 14 schematically illustrates a telecommunication network connected via an intermediate network to a host computer.
Figure 15:
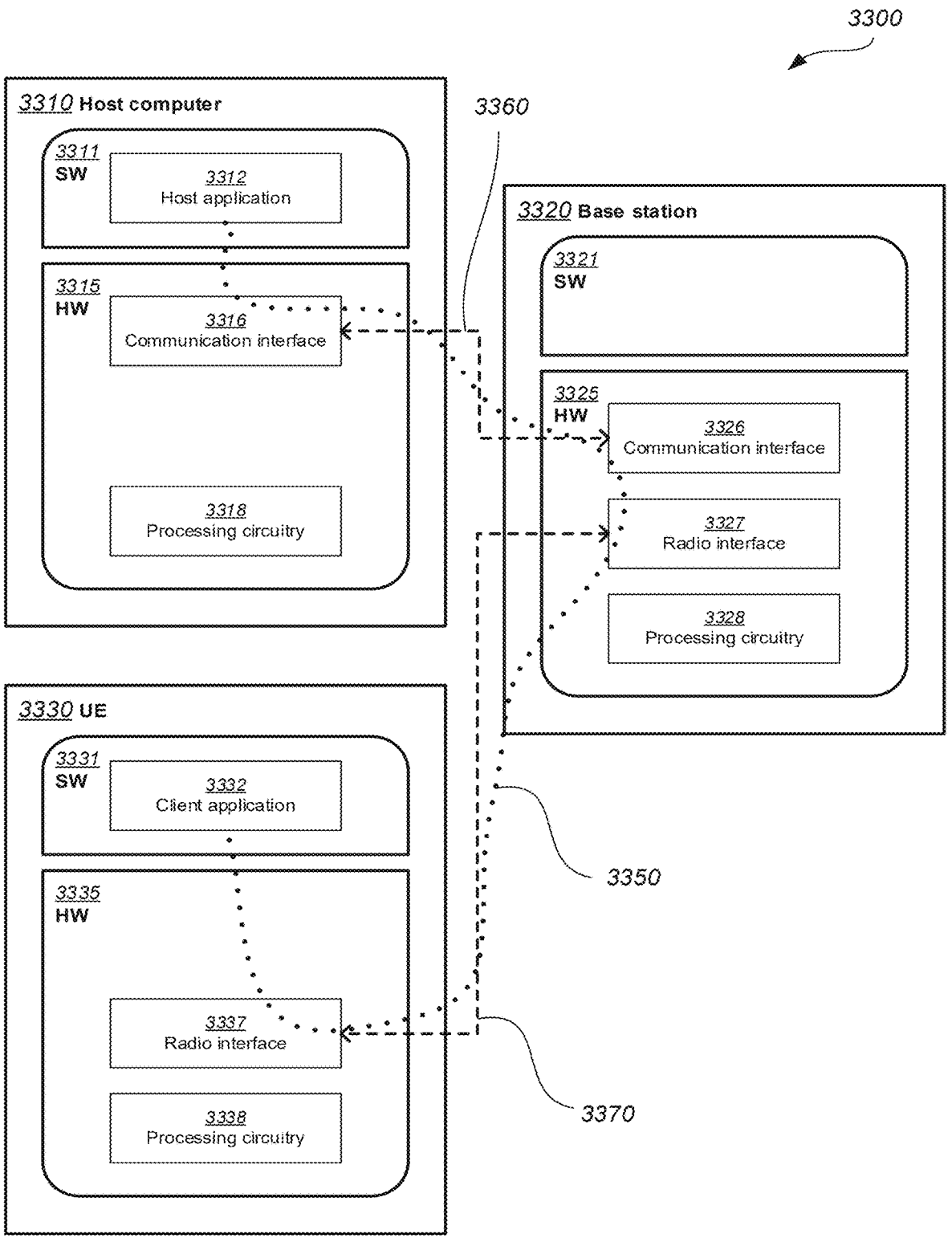
FIG. 15 is a generalized block diagram of a host computer communicating via a base station with a user equipment over a partially wireless connection.

Note that there are no FIGS. 14 and 15.

Figures 16, 17:
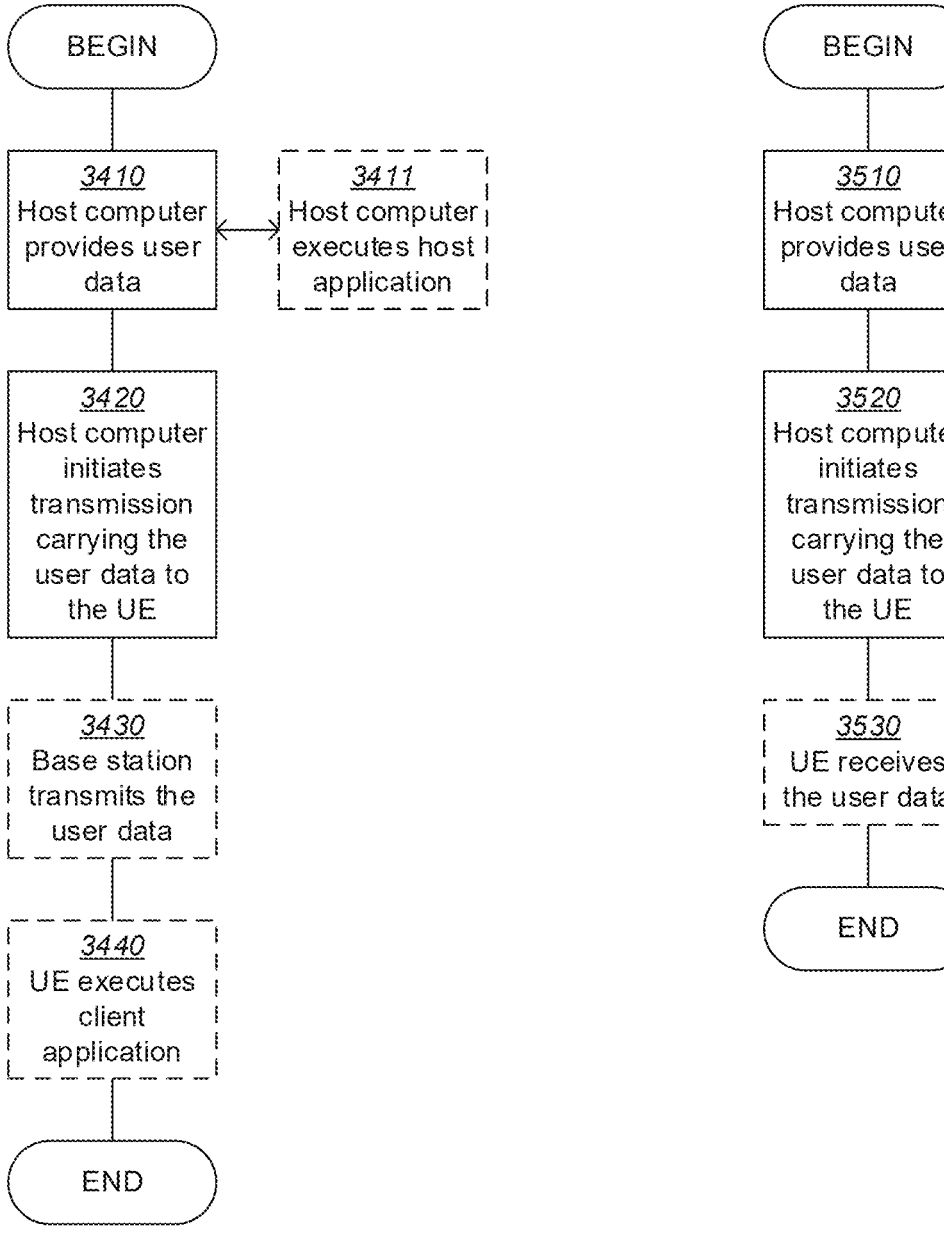
FIGS. 16 to 19 are flowcharts illustrating methods implemented in a communication system including a host computer, a base station and a user equipment.

With reference to FIG. 16, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212*a*, 3212*b*, 3212*c*, such as the source and target access node 111, 112, AP STAs NBs, eNBs, gNBs or other types of wireless access points, each defining a corresponding coverage area 3213*a*, 3213*b*, 3213*c*. Each base station 3212*a*, 3212*b*, 3212*c* is connectable to the core network 3214 over a wired or wireless connection 3215. A first user equipment (UE) such as a Non-AP STA 3291 located in coverage area 3213*c* is configured to wirelessly connect to, or be paged by, the corresponding base station 3212*c*. A second UE 3292 such as a Non-AP STA in coverage area 3213*a* is wirelessly connectable to the corresponding base station 3212*a*. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 16 as a whole enables connectivity between one of the connected UEs 3291, 3292 such as e.g. the UE 121, and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230. Example implementations, in accordance with an embodiment, of the UE, base station and host computer discussed in the preceding paragraphs will now be described with reference to FIG. 17. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 17) served by the base station 3320. The communication interface 3326 may be configured to facilitate a connection 3360 to the host computer 3310. The connection 3360 may be direct or it may pass through a core network (not shown in FIG. 17) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides. It is noted that the host computer 3310, base station 3320 and UE 3330 illustrated in FIG. 17 may be identical to the host computer 3230, one of the base stations 3212a, 3212b, 3212c and one of the UEs 3291, 3292 of FIG. 16, respectively. This is to say, the inner workings of these entities may be as shown in FIG. 17 and independently, the surrounding network topology may be that of FIG. 16.

In FIG. 17, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the data rate, latency, power consumption and thereby provide benefits such as reduced user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figures 18, 19:
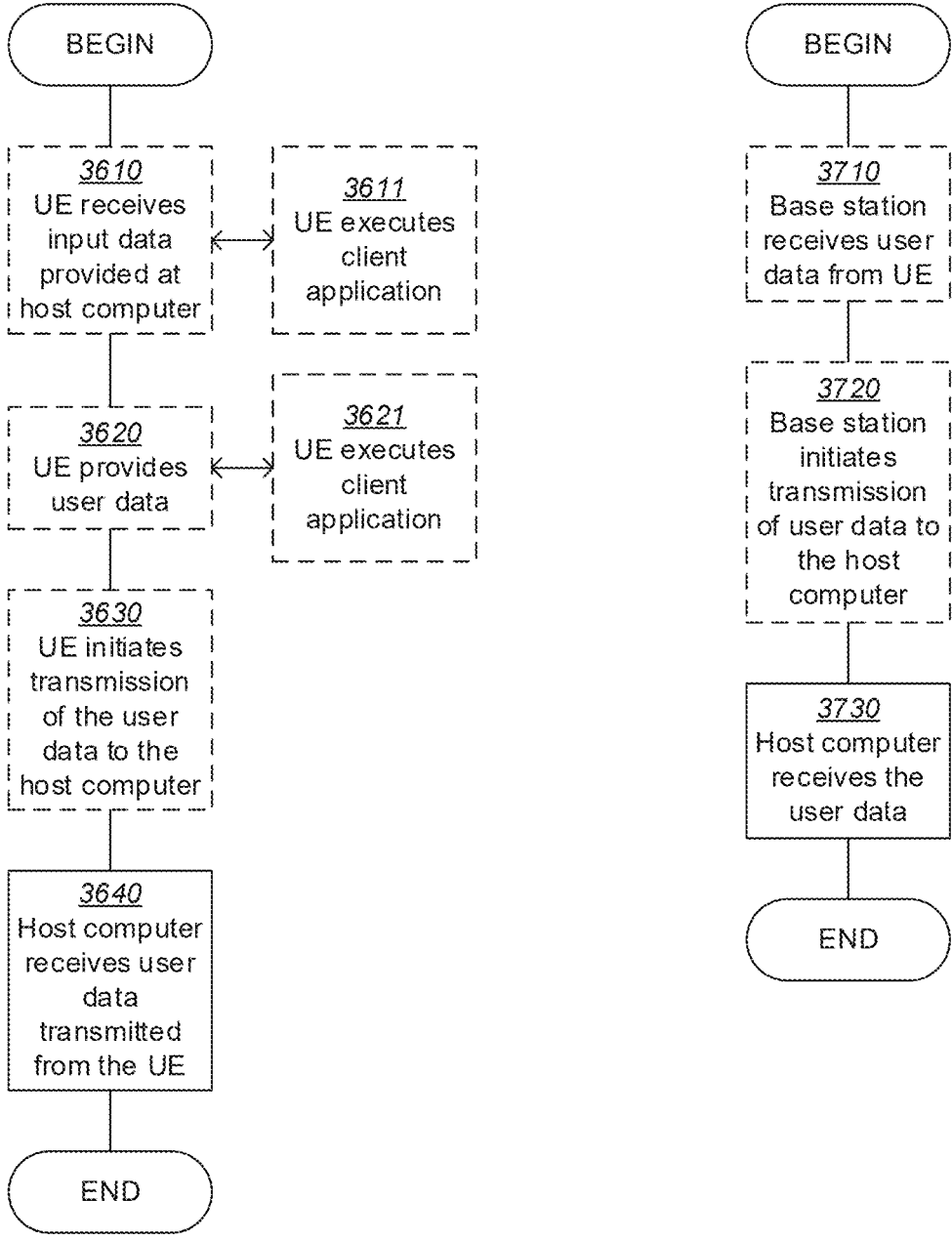

FIG. 18 is a flowchart illustrating a method implemented in a communication system, in accordance with one embodiment. The communication system includes a host computer, a base station such as a AP STA, and a UE such as a Non-AP STA which may be those described with reference to FIG. 16 and FIG. 17. For simplicity of the present disclosure, only drawing references to FIG. 18 will be included in this section. In a first action 3410 of the method, the host computer provides user data. In an optional subaction 3411 of the first action 3410, the host computer provides the user data by executing a host application. In a second action 3420, the host computer initiates a transmission carrying the user data to the UE. In an optional third action 3430, the base station transmits to the UE the user data which was carried in the transmission that the host computer initiated, in accordance with the teachings of the embodiments described throughout this disclosure. In an optional fourth action 3440, the UE executes a client application associated with the host application executed by the host computer.

FIG. 19 is a flowchart illustrating a method implemented in a communication system, in accordance with one embodiment. The communication system includes a host computer, a base station such as a AP STA, and a UE such as a Non-AP STA which may be those described with reference to FIG. 16 and FIG. 17. For simplicity of the present disclosure, only drawing references to FIG. 19 will be included in this section. In a first action 3510 of the method, the host computer provides user data. In an optional subaction (not shown) the host computer provides the user data by executing a host application. In a second action 3520, the host computer initiates a transmission carrying the user data to the UE. The transmission may pass via the base station, in accordance with the teachings of the embodiments described throughout this disclosure. In an optional third action 3512, the UE receives the user data carried in the transmission.

FIG. 20 is a flowchart illustrating a method implemented in a communication system, in accordance with one embodiment. The communication system includes a host computer, a base station such as a AP STA, and a UE such as a Non-AP STA which may be those described with reference to FIG. 16 and FIG. 17. For simplicity of the present disclosure, only drawing references to FIG. 20 will be included in this section. In an optional first action 3610 of the method, the UE receives input data provided by the host computer. Additionally or alternatively, in an optional second action 3620, the UE provides user data. In an optional subaction 3621 of the second action 3620, the UE provides the user data by executing a client application. In a further optional subaction 3611 of the first action 3610, the UE executes a client application which provides the user data in reaction to the received input data provided by the host computer. In providing the user data, the executed client application may further consider user input received from the user. Regardless of the specific manner in which the user data was provided, the UE initiates, in an optional third subaction 3630, transmission of the user data to the host computer. In a fourth action 3640 of the method, the host computer receives the user data transmitted from the UE, in accordance with the teachings of the embodiments described throughout this disclosure.

FIG. 21 is a flowchart illustrating a method implemented in a communication system, in accordance with one embodiment. The communication system includes a host computer, a base station such as a AP STA, and a UE such as a Non-AP STA which may be those described with reference to FIGS. 32 and 33. For simplicity of the present disclosure, only drawing references to FIG. 21 will be included in this section. In an optional first action 3710 of the method, in accordance with the teachings of the embodiments described throughout this disclosure, the base station receives user data from the UE. In an optional second action 3720, the base station initiates transmission of the received user data to the host computer. In a third action 3730, the host computer receives the user data carried in the transmission initiated by the base station.

When using the word "comprise" or "comprising" it shall be interpreted as non-limiting, i.e. meaning "consist at least of".

The embodiments herein are not limited to the above described preferred embodiments. Various alternatives, modifications and equivalents may be used.

The invention claimed is:

1. A method, performed by a first communications device (512a), for controlling a service session handover between network slices, the method comprising:

establishing (801) a first default data session on a first network slice (NS1) of a communications network (500a) based on a first network slice identifier (S-NS-SAI_1) of the first network slice (NS1) such that a first network address of the first communications device (512a), a first application node (521a1) of an application layer system (520a), and a first access gateway (523a1) of the application layer system (520a) is associated with the first default data session; establishing (802) an associated first dedicated service session with a second communications device (512*b*) over a first dedicated data session based on the first default data session on the first network slice (NS1);

establishing (803) a second default data session on a second network slice (NS2) of the communications network (500*a*) based on a second network slice identifier (S-NSSAI_2) of the second network slice (NS2) such that a second network address (IP2) of the first communications device (512*a*), a second application node (521*a*2) of the application layer system (520*a*), and a second access gateway (523*a*2) of the application layer system (520*a*) is associated with the second default data session; and sending (804) a session controlling message to the first application node (521*a*1), the session controlling message comprising: the second network address (IP2) of the first communications device (512*a*), a network address of the second application node, and a session identifier of the first dedicated service session, to enable reserving network resources of the second access gateway (523*a*2) for a second dedicated service session between the first communications device (512*a*) and the second communications device (512*b*) established over a second dedicated data session based on the second default data session on the second network slice, such that handover of the first dedicated service session between the first network slice (NS1) and the second network slice (NS2) is enabled.

2. The method according to claim 1, further comprising:

receiving (805) from the first application node (521*a*1), a second session controlling message with information related to the network resources of the second access gateway (523*a*2), comprising an egress network address of the second access gateway (523*a*2), for controlling the second dedicated service session on the second network slice; and sending (806) a third session controlling message to the first application node (521*a*1) comprising the egress network address of the second access gateway (523*a*2) to initiate the handover of the service session.

3. The method according to claim 1, wherein the application layer system (520*a*) is an Internet Protocol, IP, Multimedia Subsystem, IMS, the respective first and second default data session is a default Protocol Data Unit, PDU, session for IMS, the respective first and second dedicated data session is a dedicated PDU session for IMS, the respective first and second dedicated service session is a dedicated IMS session established over the associated first and second dedicated PDU session, the network address is an IP address, the session identifier is an IMS Session Initiation Protocol, SIP, session identifier for identifying the first dedicated service session and the transmitted session controlling message is a SIP INFO message comprising the IMS SIP session identifier of the dedicated IMS session.

4. The method according to claim 1, wherein the communications network (500*a*) is a 5G network.

5. The method according to claim 1, wherein the network resources of the second access gateway (523*a*2) comprise an ingress network address and an egress network address for the second dedicated service session on the second network slice (NS2).

6. A method, performed by a first application node (521*a*1) of an application layer system (520*a*) controlling service sessions, for controlling a service session handover between network slices, the method comprising:

establishing (901) a first dedicated service session between a first communications device (512*a*) and a second communications device (512*b*) over a first dedicated data session which is based on a first default data session of the first communications device (512*a*) on a first network slice (NS1) of a communications network (500*a*);

receiving (902), from the first communications device (512*a*), a session controlling message comprising: a second network address (IP2) of the first communications device (512*a*), a network address of a second application node (522_*a*2) associated with a second default data session of the first communications device (512*a*) established over a second network slice (NS2) of the communications network (500*a*), and a session identifier of the first dedicated service session, to enable reserving network resources of a second access gateway (523*a*2) for a second dedicated service session between the first communications device (512*a*) and the second communications device (512*b*) based on the second default data session, such that handover of the first dedicated service session between the first network slice (NS1) and the second network slice (NS2) is enabled; and based on the contents of the received session controlling message sending (903) a second session controlling message to the second application node (521*a*2), comprising:
  a) the second network address (IP2) of the first communications device (512*a*),
  b) a context of the first dedicated service session,
  c) a network address of an access gateway (523*b*) serving the second communications device (512*b*), to enable the second application node (521*a*2) to perform network resource reservation and establish a data path with the second communications device (512*b*) for the second dedicated service session between the first communications device (512*a*) and the second communications device (512*b*), such that handover of the first dedicated service session between the first network slice (NS1) and the second network slice (NS2) is enabled.

7. The method according to claim 6, further comprising:

receiving (904) from the second application node (521*a*2), a third session controlling message with information related to the reserved network resources of the second access gateway (523*a*2); and sending (905) a fourth session controlling message to the first communications device (512*a*) with the received information related to the reserved network resources of the second access gateway (523*a*2).

8. The method according to claim 6, further comprising:

receiving (906), from the first communications device (512*a*), a fifth session controlling message comprising an egress network address of the second access gateway (523*a*2); and sending (907) a sixth session controlling message to the access gateway serving the second communications device (512*b*) to update a stored network address of an access gateway associated with the first communications device (512*a*) to match the network address of the second access gateway (523*a*2).

9. The method according to claim 6, wherein the application layer system (520*a*) is an Internet Protocol, IP, Multimedia Subsystem, IMS, the respective data session is a Protocol Data Unit, PDU, session for IMS, and the context of the first dedicated service session is an IMS Session Initiation Protocol, SIP, session context of the dedicated IMS session.

10. The method according to claim 6, wherein the second session controlling message further comprises other network address information related to a data path of the second dedicated service session.

11. A method, performed by a second application node (521a2) of an application layer system (520a), for controlling a dedicated service session handover between a first network slice (NS1) and a second network slice (NS2), the method being at least partly performed during a first dedicated service session between a first communications device (512a) (512a) and a second communications device (512b) established over a first dedicated data session which is based on a first default data session of the first communications device (512a) on the first network slice (NS1) of a communications network (500a) comprising the first and the second network slices (NS1, NS2), wherein the first default data session is based on a first network slice identifier (S-NS-SAI_1) such that a first network address (IP1) of the first communications device (512a), a first application node (521a1) of the application layer system (520a), and a first access gateway (523a1) of the application layer system (520a) is associated with the first default data session, and the method comprising:

registering (1001) the first communications device (512a) in the application layer system (520a) for a second default service session to be established over a second default data session, based on a second network slice identifier (S-NSSAI2) such that a second network address (IP2) of the first communications device (512a), the second application node (521a2), and a second access gateway (523a2) is associated with the second default service session;

receiving (1002), from a first application node (521a1) associated with the first network slice (NS1) and controlling the first dedicated data session, a session controlling message comprising:
    a) the second network address (IP2) of the first communications device (512a);
    b) a context of the first dedicated service session;
    c) a network address of an access gateway (523b) serving the second communications device (512b), to enable the second application node (521a2) to perform network resource reservation and establish a data path with the second communications device (512b) for a second dedicated service session between the first communications device (512a) and the second communications device (512b) based on the second default data session, such that handover of the first dedicated service session between the first network slice (NS1) and the second network slice (NS2) is enabled;

reserving (1004) network resources of the second access gateway (523a2) for the first dedicated service session to be transferred to the second dedicated service session based on the received session controlling message; and sending (1005) to the first application node (521a1) a second session controlling message with information related to the reserved network resources of the second access gateway (523a2).

12. The method according to claim 11, further comprising:
  storing (1003) the context of the first dedicated service session.

13. The method according to claim 11 or 12, further comprising:
  connecting (1006) an egress network address of the second access gateway (523a2) towards the second network address (IP2) of the first communications device (512a), for a predetermined time;
  starting (1007) a timer for the predetermined time;
  stopping (1008a) the timer if data is received over the second dedicated service session within the predetermined time; and
  abandoning (1008b) the reserved resources for the second dedicated service session if data is not received over the second dedicated service session within the predetermined time.

14. A computer program (1103, 1203, 1303) comprising instructions, which when executed by a processor (1104, 1204, 1304), causes the processor (11104, 1204, 1304) to perform actions according to claim 1.

15. A carrier (1105, 1205, 1305) comprising the computer program of claim 14, wherein the carrier is one of an electronic signal, an optical signal, an electromagnetic signal, a magnetic signal, an electric signal, a radio signal, a microwave signal, or a computer-readable storage medium.

* * * * *